(12) United States Patent
Shima et al.

(10) Patent No.: US 9,309,398 B2
(45) Date of Patent: Apr. 12, 2016

(54) EXPANDED COMPOSITE RESIN BEADS AND MOLDED ARTICLE THEREOF

(75) Inventors: Masaomi Shima, Aichi (JP); Koki Nishijima, Aichi (JP)

(73) Assignee: JSP CORPORATION, Tokyo (JP)

( * ) Notice: Subject to any disclaimer, the term of this patent is extended or adjusted under 35 U.S.C. 154(b) by 107 days.

(21) Appl. No.: 14/342,295

(22) PCT Filed: Jul. 20, 2012

(86) PCT No.: PCT/JP2012/068413
§ 371 (c)(1),
(2), (4) Date: Feb. 28, 2014

(87) PCT Pub. No.: WO2013/031417
PCT Pub. Date: Mar. 7, 2013

(65) Prior Publication Data
US 2014/0221517 A1 Aug. 7, 2014

(30) Foreign Application Priority Data

Sep. 1, 2011 (JP) ................................. 2011-191001

(51) Int. Cl.
| | |
|---|---|
| *C08L 23/12* | (2006.01) |
| *C08L 25/06* | (2006.01) |
| *C08L 23/10* | (2006.01) |
| *C08J 9/00* | (2006.01) |
| *C08J 9/228* | (2006.01) |

(52) U.S. Cl.
CPC ............... *C08L 25/06* (2013.01); *C08J 9/0061* (2013.01); *C08J 9/228* (2013.01); *C08L 23/10* (2013.01); *C08L 23/12* (2013.01); *C08J 2325/04* (2013.01); *C08J 2423/10* (2013.01); *C08L 2203/14* (2013.01)

(58) Field of Classification Search
CPC ...... C08J 9/0061; C08J 9/228; C08J 2325/04; C08J 2423/10; C08L 23/10; C08L 23/12; C08L 25/06; C08L 2203/14
See application file for complete search history.

(56) References Cited

U.S. PATENT DOCUMENTS

| | | | |
|---|---|---|---|
| 8,329,294 | B2 | 12/2012 | Ishida et al. |
| 2009/0274890 | A1 | 11/2009 | Ishida et al. |
| 2010/0209689 | A1 | 8/2010 | Shima et al. |
| 2012/0149792 | A1 | 6/2012 | Shima |

FOREIGN PATENT DOCUMENTS

| | | |
|---|---|---|
| JP | 2007-246606 | 9/2007 |
| JP | 2011-58008 | 3/2008 |
| JP | 2008-239794 | 10/2008 |
| JP | 2008-266583 | 11/2008 |
| JP | 4502234 | 7/2010 |
| JP | 2011-074152 | 4/2011 |
| WO | 2007/099833 | 9/2007 |
| WO | 2009/057432 | 5/2009 |

OTHER PUBLICATIONS

U.S. Appl. No. 14/508,016, filed Oct. 7, 2014, Shima.
International Search Report Issued Oct. 9, 2012 in PCT/JP12/068413 filed Jul. 20, 2012.
U.S. Appl. No. 14/279,907, filed May 16, 2014, Shima.
International Preliminary Report on Patentability issued Mar. 4, 2014 in PCT/JP2012/068413 filed on Jul. 20, 2012.
Written Opinion issued Oct. 9, 2012 in in PCT/JP2012/068413 filed on Jul. 20, 2012 (English translation).
U.S. Appl. No. 14/824,564, filed Aug. 12, 2015, Shima.

*Primary Examiner* — Irina S Zemel
(74) *Attorney, Agent, or Firm* — Oblon, McClelland, Maier & Neustadt, L.L.P.

(57) ABSTRACT

Provided is an expanded composite resin bead comprising a styrene resin and a propylene resin. The content of the propylene resin component in the expanded composite resin bead is from 20 to 40% by mass relative to a total of 100% by mass of the styrene resin component and the propylene resin component. In a transmission electron micrograph of a cross-section of a cell wall 1 forming the expanded composite resin bead, disperse phases 3 made of the styrene resin are dispersed in a continuous phase 2 made of the propylene resin. An average value of the maximum diameters of the disperse phases 3 is from 0.01 to 1 μm and a value of ratio of the average value of the maximum diameters to an average value of the minimum diameters of the disperse phases 3 is from 1 to 10.

13 Claims, 4 Drawing Sheets

EXPANDED COMPOSITE RESIN BEADS AND MOLDED ARTICLE THEREOF

CROSS REFERENCE TO RELATED APPLICATIONS

The present application is a 35 U.S.C. §371 national stage patent application of International patent application PCT/JP2012/068413, filed on Jul. 20, 2012, published as WO/2013/031417 on Mar. 7, 2013, the text of which is incorporated by reference, and claims the benefit of the filing date of Japanese application no. 2011-191001, filed on Sep. 1, 2011, the text of which is also incorporated by reference.

TECHNICAL FIELD

The present invention relates to an expanded composite resin bead and a molded article of the expanded composite resin beads obtained by in-mold molding of the expanded beads.

BACKGROUND ART

A foamed product made of a thermoplastic resin can be imparted with characteristics such as a lightweight property, a shock-absorbing property, a thermal insulating property, and the like, and is widely used as a packaging material, a building material, a thermal insulation material, and the like.

Above all, a foamed product made of a styrene resin is suitable as a packaging material, a building material, and a thermal insulation material because it is economical and possesses good expandability, and moreover is excellent in thermal insulating property, heat-retaining property, and stiffness. However, the foamed product made of a styrene resin has a drawback that it is inferior in heat resistance and a restoring property. Therefore, in applications such that the heat resistance and the restoring property are required, there is being used a foamed product made of, for example, a propylene resin.

On the other hand, the foamed product made of a propylene resin is inferior in stiffness compared to the foamed product made of a styrene resin. Furthermore, in order to secondarily expand as well as to mutually fuse together the propylene resin expanded beads in in-mold molding, there is needed heating at a higher temperature, namely heating with steam having higher saturated vapor pressure compared to in-mold molding of the polystyrene resin expanded beads. Therefore, a mold of high-pressure specification and a dedicated molding machine with high press pressure become necessary and, as a result, the cost of energy to be used also increases.

In order to solve these problems, there is proposed a molded article of expanded composite resin beads including a propylene resin component and a styrene resin component.

For example, in Patent Document 1, there is proposed a styrene-modified propylene resin obtained by impregnating a polypropylene resin with vinyl monomers followed by graft polymerization, wherein the ratio of [the content of the polypropylene resin]/[the content of a polymer of the vinyl monomers] is 95-60% by weight/5-40% by weight.

Furthermore, in Patent Documents 2 and 3, there is proposed a styrene-modified propylene resin obtained by impregnating a polypropylene resin with vinyl monomers followed by graft polymerization, wherein the ratio of [the content of the polypropylene resin]/[the content of a polymer of the vinyl monomers] is 50-20% by weight/50-80% by weight.

Further, in Patent Document 4, there is proposed a styrene-modified propylene resin wherein the ratio of [the content of the polypropylene resin]/[the content of the polymer of the vinyl monomers] is 76.9-14.3% by weight/23.1-85.7% by weight.

PRIOR ART DOCUMENT

Patent Documents

Patent Document 1: Japanese Patent No. 4502234
Patent Document 2: JP 2008-239794 A
Patent Document 3: JP 2008-266583 A
Patent Document 4: WO 2007/099833

SUMMARY OF THE INVENTION

Problem to be Solved by the Invention

However, in the technique described in the above-mentioned Patent Document 1, even though decrease in heating temperature at the time of in-mold molding and increase in stiffness are observed compared to the expanded polypropylene resin beads, there is still room for improvement and further upgrading is desired. Also, according to the conventional technique, it is difficult to control a morphology of an olefin resin and a styrene resin, and thus there is a problem that target physical properties are difficult to obtain.

Furthermore, with regard to molded articles of expanded composite resin beads obtained in the Patent Documents 2 to 4 above, the molded articles with excellent stiffness can be obtained when the content of a polymer of the vinyl monomers is high. However, in such molded articles as obtained in Patent Documents 2 to 4, compression permanent set of the molded articles is large and there is room for improvement of the restoring property.

The present invention was made in view of such a background to provide a molded article of expanded composite resin beads having excellent stiffness, heat resistance and restoring property and the expanded composite resin bead which enables to produce the aforesaid molded article.

Means for Solving the Problem

The present inventors conducted diligent research to solve the above-mentioned problems and consequently found that an expanded composite resin bead which can solve the problems in the present invention can be provided by optimizing a morphology of a propylene resin and a styrene resin and the like, the morphology being confirmed in a cross-section of a cell wall which forms the expanded composite resin bead including the styrene resin and the propylene resin in a transmission electron micrograph. This finding led to completion of the present invention.

One aspect of the present invention provides an expanded composite resin bead including a styrene resin and a propylene resin, wherein a content of a propylene resin component in the expanded composite resin bead is from 20 to 40% by mass with respect to a total of 100% by mass of a styrene resin component and the propylene resin component;

a large number of disperse phases made of the styrene resin are dispersed in a continuous phase made of the propylene resin in a cross-section of a cell wall forming the expanded composite resin bead in a transmission electron micrograph, and an average value of the maximum diameters (hereinafter occasionally referred to as simply "an average maximum diameter") of the disperse phases is from 0.01 to 1 μm and a value of ratio of the average maximum diameter to an average value of the minimum diameters (hereinafter occasionally referred to as simply "an average minimum diameter") of the disperse phases is from 1 to 10.

Another aspect of the present invention provides a molded article of expanded composite resin beads, which is obtained by in-mold molding of the aforesaid expanded composite resin beads, wherein a density is from 10 to 200 kg/m$^3$, a closed cell ratio is 70% or more, and a fusion ratio is 60% or more.

Effect of the Invention

In the expanded composite resin bead, the content of the propylene resin component is 20 to 40% by mass with respect to a total of 100% by mass of the styrene resin component and the propylene resin component. And, in the transmission electron micrograph of the cross-section of the cell wall which forms the expanded composite resin beads, a large number of the disperse phases made of the styrene resin are dispersed in the continuous phase made of the propylene resin. Further, the average maximum diameter of the disperse phases is from 0.01 to 1 μm and the value of ratio of the average maximum diameter to the average minimum diameter of the disperse phases is from 1 to 10. Therefore, the characteristics of the polypropylene resin and the polystyrene resin which are excellent respectively in heat resistance and stiffness, can be compatibly achieved, and the expanded composite resin bead is excellent especially in restoring property. When the expanded composite resin bead is used, there can be obtained a molded article of expanded composite resin beads having excellent heat resistance, stiffness, and a restoring property.

Further, in the molded article of expanded composite resin beads formed by in-mold molding of the expanded composite resin beads, the density is from 10 to 200 kg/m$^3$, the closed cell ratio is 70% or more, and the fusion ratio is 60% or more. Therefore, the molded article of expanded composite resin beads has excellent mechanical strength such as a compression property and the like and shows little variation in density.

MODES FOR CARRYING OUT THE INVENTION

Figure 1:
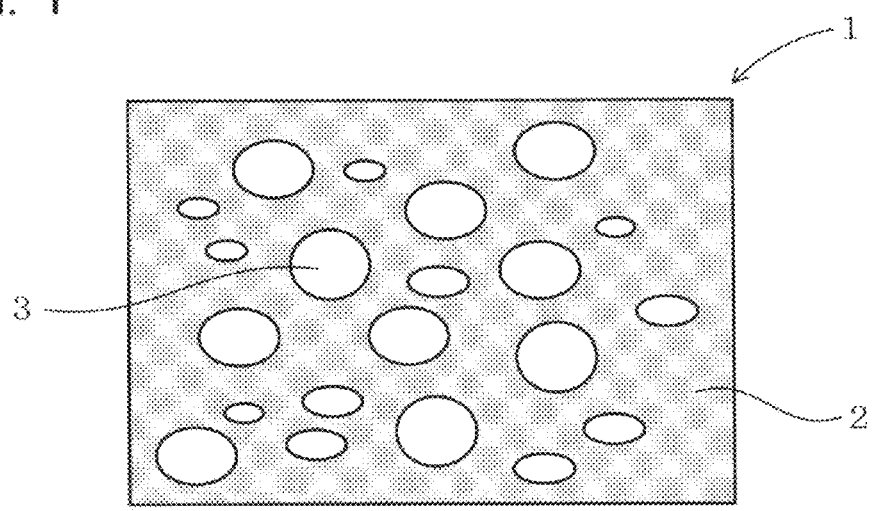
FIG. 1 An explanatory drawing which schematically shows a dispersion state of a propylene resin and a styrene resin in a cell wall which forms an expanded composite resin bead FIG. 2 A photograph substituting for a drawing, which pertains to Example 1 and shows an observation of a cross-section of the central portion of an expandable composite resin bead by a transmission electron microscope (magnification: ×10000).

Next, modes to carry out the above-described expanded composite resin bead and a molded article of the expanded composite resin beads will be described.

In the expanded composite resin bead, the cell wall which forms the expanded bead is composed of a composite resin including a plurality of and not a few of disperse phases composed mainly of a styrene resin dispersed in a continuous phase composed mainly of a propylene resin.

When observing an internal cross-section of an expanded composite resin bead by means of a transmission electron microscope, the cross-section forms a sea-island structure wherein the disperse phases having nearly circular and/or indeterminate granular shapes are dispersed in the continuous phase. In the expanded composite resin bead, the disperse phases are dispersed so that the average maximum diameter comes within a range of from 0.01-1 μm. In other words, with regard to the large number of disperse phases dispersed in the continuous phase of the expanded composite resin bead, the average value of the maximum diameter of each disperse phase is 0.01 to 1 μm. That is, when measuring the maximum diameter of each of a plurality of disperse phases, the average value of these maximum diameters comes within a range of from 0.01 to 1 μm. Also, in the expanded composite resin bead, the disperse phases are dispersed in such a way that the average value of the maximum diameter/the average value of the minimum diameter be in the range of from 1 to 10. In other words, for the large number of disperse phases dispersed in the continuous phase of the expanded composite resin bead, a value of ratio of the average maximum diameter of each disperse phase with respect to the average value of the minimum diameter thereof, (average value of the maximum diameter/average value of the minimum diameter), is 1 to 10. That is, when the maximum and minimum diameters of each disperse phase are measured for the plurality of disperse phases and the average values of these maximum diameters and minimum diameters are calculated, the value of ratio thereof, (average value of the maximum diameter/average value of the minimum diameter), comes within a range of from 1 to 10. Therefore, the expanded composite resin bead can exhibit an excellent restoring property. Hereinafter, the average value of the maximum diameter and the average value of the minimum diameter are referred to as $DMAX_{ave}$ and $DMIN_{ave}$, respectively. Further, in the cross-section of the expanded composite resin bead, the styrene resin which forms the disperse phases is preferably dispersed in the continuous phase in, for example, a nearly circular shape (including a circular shape) or a nearly oval shape (including an oval shape).

As physical properties of the expanded composite resin bead, brittle and rigid properties of the polystyrene resin are strongly reflected instead of the physical properties of the polypropylene resin which has an excellent restoring property in the following cases. The cases include a case when, in the cell wall which forms the expanded composite resin bead, disperse phases composed mainly of the propylene resin are dispersed in a continuous phase composed mainly of the styrene resin; a case when, in the cell wall which forms the expanded composite resin bead, the propylene resin and the styrene resin are forming a co-continuous phase; a case when, in the cell wall which forms the expanded composite resin bead, $DMAX_{ave}$ of the disperse phases composed mainly of the styrene resin dispersed in a continuous phase composed mainly of the propylene resin, exceeds fpm; and a case when $DMAX_{ave}/DMIN_{ave}$ of the disperse phases exceeds 10. Therefore, the molded article of the above expanded composite resin beads is liable to break when external force is applied and the restoring property thereof become inferior.

On the other hand, when $DMAX_{ave}$ of the disperse phases composed mainly of the styrene resin is less than 0.01 μm, a retaining property of a blowing agent becomes worse. Therefore, an amount of the blowing agent remaining in the expanded composite resin bead decreases, resulting in a higher heating temperature at the time of in-mold molding. Also, in this case, it becomes difficult for the physical properties of the polystyrene resin to be reflected sufficiently, resulting in deterioration in stiffness.

In addition, $DMAX_{ave}$ of the disperse phases is more preferably from 0.03 to 1 μm and even more preferably from 0.05 to 1 μm. Furthermore, the value of ratio of $DMAX_{ave}$ to $DMIN_{ave}$ of the disperse phases, ($DMAX_{ave}/DMIN_{ave}$), is more preferably from 1 to 7, even more preferably from 1 to 5 and especially preferably from 2 to 5.

$DMAX_{ave}$ and $DMIN_{ave}$ of the disperse phases in the cell wall which forms the expanded composite resin bead can be measured by carrying out the following procedures.

Specifically, first, a sample for observation is cut from the central portion of an expanded composite resin bead. Subsequently, the sample cut for observation is embedded in an epoxy resin and dyed with ruthenium tetroxide, followed by preparation of an ultrathin section by means of an ultramicrotome. This ultrathin section is placed on a grid and the morphology of the internal cross-section of the expanded composite resin bead is observed by a transmission electron microscope (JEM 1010 manufactured by JEOL Ltd.). And, based on a micrograph of 50000 magnifications, the maximum and minimum diameters of the dyed disperse phase on the cross-section of the cell wall are measured. In addition, when the shape of the disperse phase is a circle, the maximum and minimum diameters mean its diameter. On the other hand, when the disperse phase assumes other shapes, the maximum and minimum diameters mean the long side and short side of a circumscribed rectangle of the disperse phase, respectively.

Further, five expanded beads are randomly selected from a group of expanded composite resin beads to be used for molding and, in the cross-section of a cell wall of each expanded composite resin bead to be observed as mentioned above, 20 disperse phases are selected randomly and the maximum and minimum diameters of each of them are measured. The arithmetic averages of 100 values each are calculated and are taken as $DMAX_{ave}$ and $DMIN_{ave}$ of the disperse phases.

In the expanded composite resin bead, the styrene resin which forms the disperse phases includes a polymer of styrene monomers and a copolymer of styrene monomers and a monomer component which is copolymerizable with the styrene monomers. The monomer component which is copolymerizable with the styrene monomers includes, for example, alkyl esters of acrylic acid (the carbon number of the alkyl group is 1-10), alkyl esters of methacrylic acid (the carbon number of the alkyl group is 1-10), styrene derivatives, nitrile groups-containing unsaturated hydrocarbons, and the like. One or a combination of two or more of these can be used.

The alkyl esters of acrylic acid specifically include, for example, methyl acrylate, ethyl acrylate, propyl acrylate, butyl acrylate, 2-ethylhexyl acrylate, and the like.

The alkyl esters of methacrylic acid include, for example, methyl methacrylate, ethyl methacrylate, propyl methacrylate, butyl methacrylate, 2-ethylhexyl methacrylate, and the like.

The styrene derivatives include, for example, α-methylstyrene, o-methylstyrene, m-methylstyrene, p-methylstyrene, vinyltoluene, p-ethylstyrene, 2,4-dimethylstyrene, p-methoxystyrene, p-phenylstyrene, o-chlorostyrene, m-chlorostyrene, p-chlorostyrene, 2,4-dichlorostyrene, p-n-butylstyrene, p-t-butylstyrene, p-n-hexylstyrene, p-octylstyrene, styrenesulfonic acid, sodium styrenesulfonate, and the like. The nitrile groups-containing unsaturated hydrocarbons include, for example, acrylonitrile, methacrylonitrile, and the like.

The styrene resin specifically includes one or a mixture of two or more selected from polystyrene, rubber-modified polystyrene, an acrylonitrile-butadiene-styrene resin, an acrylonitrile-styrene resin, and an acrylonitrile-ethylene-styrene resin. Preferably, there may be mentioned polystyrene and/or a copolymer of styrene and an acrylic monomer such as butyl acrylate and the like.

Furthermore, in the styrene resin, the content of the styrene monomer component in the copolymer of styrene monomers and the monomer component which is copolymerizable with the styrene monomers is preferably 50% by mass or more. Meanwhile, in the present description, the styrene monomer and the monomer component which is copolymerizable with the styrene monomer are generically referred to as a styrene-based monomer.

Next, in the expanded composite resin bead, the polypropylene resin which constitutes the continuous phase includes a propylene (co)polymer containing a propylene component, for example, in an amount of 70% by mass or more. Specifically, there may be mentioned a propylene (co)polymer including, for example, a propylene homopolymer, a propylene-ethylene random copolymer, a propylene-ethylene block copolymer, a propylene-butene random copolymer, a propylene-butene block copolymer, a propylene-ethylene-butene random copolymer, and the like. The propylene resin which forms the continuous phase may be a resin obtained by combining two or more of these polymers. When the propylene resin includes the polymer exemplified above, it becomes possible to produce a good expanded bead. Among these, preferable is a copolymer of propylene and ethylene and/or an α-olefin having 4 to 20 carbon atoms, and more preferable is the copolymer polymerized by using a metallocene-type polymerization catalyst.

In the expanded composite resin bead, when the total of the styrene resin component and the propylene resin component is taken as 100% by mass, the propylene resin component accounts for 20 to 40% by mass. When there is too much propylene resin component and too little styrene resin component, there are fears that a desired expansion ratio is not obtained and that stiffness becomes insufficient. On the other hand, when there is too little propylene resin component and too much styrene resin component, there are fears that heat resistance becomes insufficient and that, even if the specific morphology is satisfied, the restoring property becomes insufficient.

Further, in the expanded composite resin bead, a melting point of the propylene resin is preferably from 115 to 140° C.

In this case, the molding temperature for in-mold molding the expanded composite resin beads in a mold can be lowered. From this viewpoint, the melting point of the polypropylene resin is more preferably from 115 to 130° C. On the other hand, when the melting point of the polypropylene resin is too low, there is a fear that heat resistance becomes deteriorated.

The melting point of the polypropylene resin can be measured, for example, in the following manner.

First, 1.0 g of the expanded composite resin beads is added to a flask containing 200 ml of xylene and the flask is heated by means of a mantle heater for 8 hours to carry out Soxhlet extraction. The xylene solution containing the extract is poured into 600 ml of acetone and is subjected to decantation and evaporation to dryness under reduced pressure to obtain a polypropylene resin as an acetone insoluble matter. Then, with 2 to 4 mg of the polypropylene resin obtained, a heat-flux differential scanning calorimetry measurement was performed by using a DSC measuring instrument (Type 2010 manufactured by TA Instruments, and the like) under specific conditions of heat treatment conducted based on JIS K7121 (1987). By the measurement, the melting point is obtained as a peak temperature of an endothermic peak on the DSC curve obtained under a condition of a heating rate of 10° C./min.

Further, in the expanded composite resin bead, a weight average molecular weight (Mw) of the styrene resin is preferably from 300,000 to 500,000.

In this case, when molding the expanded composite resin beads in a mold, the fusion property between the expanded composite resin beads can be improved and dimensional stability of the molded article can also be enhanced. From this viewpoint, the weight-average molecular weight (Mw) of the styrene resin is more preferably from 300,000 to 450,000.

The weight-average molecular weight (Mw) of the styrene resin can be measured by a gel permeation chromatography (GPC) method (a mixed gel column for measurement of polymers) using polystyrene as a standard material. For example, Mw can be obtained in the following manner.

Specifically, first, 1.0 g of the expanded composite resin beads is added to a flask containing 200 ml of xylene and the flask is heated by means of a mantle heater for 8 hours to carry out Soxhlet extraction. The xylene solution containing the extract was poured into 600 ml of acetone and is subjected to decantation and evaporation to dryness under reduced pressure to obtain the polystyrene resin as an acetone soluble matter. Then, 35 mg of the styrene resin obtained is dissolved in 5.5 ml of tetrahydrofuran, and a measurement is performed by using a GPC measuring apparatus (GPC-8020 Model II manufactured by Tosoh Corporation, and the like) under the following measurement conditions, eluent: tetrahydrofuran (THF); flow rate: 2 ml/min; and column: TSK-GEL GMH manufactured by Tosoh Corporation. Subsequently conducting calibration with standard polystyrene, the weight average molecular weight can be obtained.

Further, the content of a physical blowing agent in the expanded composite resin beads is preferably 0.5 parts by mass or more with respect to 100 parts by mass of the expanded composite resin beads.

In this case, it is possible to improve the fusion property between the expanded composite resin beads at the time of in-mold molding thereof. From this viewpoint, it is more preferable that the content of the physical blowing agents is 1 part by mass or more with respect to 100 parts by mass of the expanded composite resin beads. In addition, from a viewpoint of shortening the molding cycle, the content of the physical blowing agent is preferably 5 parts by mass or less with respect to 100 parts by mass of the expanded composite resin beads.

The content of the physical blowing agent in the expanded composite resin beads can be determined, for example, in the following manner.

Specifically, after pre-expansion of the expandable composite resin beads, the expanded beads are left at a temperature of 23° C. and relative humidity of 50% in an open environment for 24 hours. Thereafter, the content of the physical blowing agent in the expanded composite resin beads is measured. The expanded composite resin beads are dissolved in dimethylformamide and subjected to gas chromatography to measure the content (% by mass) of the physical blowing agent. In addition, the analytical conditions in gas chromatography are, for example, as follows:

Instrument used: gas chromatograph GC-8A manufactured by Shimadzu Corporation;

Column material: a glass column (3 mm inner diameter× 4000 mm length);

Column packing material: [liquid phase] DOP-B, [liquid phase impregnation ratio] 30% by mass, [support] diatomaceous earth for gas chromatography (Chromosorb P), [particle diameter of support] 60/80 mesh, and [treatment of support] AW (acid treatment);

Injection port temperature: 100° C.;

Column temperature: 50° C.;

Detector temperature: 100° C.;

Carrier gas: $N_2$, flow rate 50 m/min;

Detector: FID (hydrogen flame ionization detector); and

Quantification: internal reference method.

Next, a production method of the expanded composite resin beads will be described. The expanded composite resin beads having a specific morphology can be manufactured through the after-mentioned modification process, impregnation process, and expanding process.

In the modification process, propylene resin beads (hereinafter, referred to as "nuclear beads" when suitable) are suspended in an aqueous medium containing, for example, a suspension agent, a surfactant, a water-soluble polymerization inhibitor, and the like to prepare a suspension. Subsequently, styrene monomers are added to the suspension, and the styrene monomers are impregnated into the nuclear beads and suspension-polymerized in the presence of a polymerization initiator. Herewith, there are obtained composite resin beads including a propylene resin component and a styrene resin component.

Meanwhile, in the above process, the composite resin beads is impregnated with a physical blowing agent during the polymerization and/or after the polymerization and, in the expanding process, the expandable composite resin beads impregnated with the physical blowing agent is heated and foamed to obtain expanded composite resin beads.

In obtaining the expanded composite resin beads, important are the operating procedures in the modification process to obtain the expandable resin bead, which are in a stage prior to expanding.

In the modification process, first, the styrene monomers are added to the suspension of the propylene resin beads suspended in an aqueous medium in an amount of 150 to 400 parts by mass relative to 100 parts by mass of the propylene resin beads. Subsequently, the propylene resin beads are impregnated with the styrene monomers, which are polymerized by heating to obtain the composite resin beads. Hereat, the styrene monomers are added in portions and when the amount of styrene monomers added at a temperature of below 80° C., the amount of styrene monomers added at a temperature of 80° C. or higher, and the amount of the propylene resin beads are denoted by C (% by mass), D (% by mass), and E (% by mass), respectively, employment of a multi-step polymerization process which satisfies the following Equations (1) to (3) makes it possible to obtain the composite resin beads having a morphology where disperse phases made of a styrene resin and having relatively small dispersion diameters are dispersed in a continuous phase made of a propylene resin:

$$0.50 < C/E \leq 4 \quad \text{Equation (1)}$$

$$C/(C+D+E) \geq 0.2 \times C/D \quad \text{Equation (2)}$$

$$C/(C+D+E) < 0.1 \times C/D + 0.4 \quad \text{Equation (3)}$$

Furthermore, in the composite resin bead, $DMAX_{ave}$ confirmed by the cross-section photograph of the disperse phases is preferably from 0.01 to 1 µm, more preferably from 0.03 to 1 µm, and even more preferably 0.05 to 1 µm. Also, in the composite resin bead, the value of ratio of $DMAX_{ave}$ to $DMIN_{ave}$ ($DMAX_{ave}/DMIN_{ave}$) of the disperse phases is preferably from 1 to 3 and more preferably from 1 to 2.

$DMAX_{ave}$ and $DMIN_{ave}$ of the disperse phases of the composite resin bead can be obtained in the same manner as the above-mentioned measurement method of $DMAX_{ave}$ and $DMIN_{ave}$ of the disperse phases in the cell wall which forms the expanded composite resin bead, except that the central portion of the composite resin bead is used as the sample for observation and they are measured based on a micrograph taken at magnification of 10000 times.

In the modification process, when C/E, the blending weight ratio of styrene monomers added at a temperature below 80° C. and the propylene resin beads is 0.50 or less, it is possible to obtain the composite resin beads and the expandable composite resin beads wherein disperse phases composed mainly of the styrene resin is dispersed in a continuous phase composed mainly of the propylene resin. However, because the dispersion particle diameter of the disperse phases becomes too large, it is thought that, when the expandable composite resin beads are heated and foamed, mutual coalescence of the disperse phases made of the styrene resin occurs. As a result, the propylene resin and the styrene resin form a co-continuous phase, or the disperse phases composed mainly of the propylene resin are dispersed in the continuous phase composed mainly of the styrene resin, or the disperse phases composed mainly of the styrene resin become unable to be dispersed in the continuous phase composed mainly of the propylene resin with the dispersion particle diameters maintained in the preferable range. Therefore, there is a fear that, in the cell wall which forms the expanded composite resin bead obtained, the morphology becomes unable to be formed where the disperse phases composed mainly of the styrene resin is dispersed in a specific range in the continuous phase composed mainly of the propylene resin. As a result, there is a fear that a molded article of expanded composite resin beads which exhibits good physical properties become unable to be obtained.

On the other hand, when C/E exceeds 4, the styrene monomers cannot be impregnated sufficiently into the polypropylene resin beads and there is a fear that the suspension becomes unstable and aggregates of the styrene resin are produced. From this viewpoint, in the modification process, the value of C/E is more preferably from 0.55 to 1.6 and even more preferably from 0.65 to 1.2.

Furthermore, in the modification process, when $C/(C+D+E) \geq 0.1 \times C/D + 0.4$, there is a fear that heat resistance or the restoring property of a molded article formed by molding the expanded composite resin beads in a mold becomes insufficient. On the other hand, when $C/(C+D+E) < 0.2 \times C/D$, there is a fear that the desired expansion ratio cannot be obtained. Also, in this case, a fear arises that stiffness of the molded article formed by molding of the expanded composite resin beads in a mold becomes insufficient. From this viewpoint, the value of $C/(C+D+E)$ more preferably satisfies $C/(C+D+E) \leq 0.1 \times C/D + 0.35$ and even more preferably satisfies $C/(C+D+E) \leq 0.1 \times C/D + 0.3$.

In addition, from viewpoints that the composite resin beads, which have a morphology where disperse phases made of the styrene resin and having a relatively small dispersion particle diameter are dispersed in the continuous phase made of the propylene resin, can be obtained more easily and that the molded article of expanded composite resin beads having an excellent restoring property is obtained, $C/(C+D)$ is preferably 0.5 or more and even more preferably 0.5 to 0.8 in the modification process.

Additionally, in the modification process, when the styrene monomers are added after the temperature exceeded 80° C., there is a fear that the styrene monomers polymerizes before it is sufficiently impregnated into the polypropylene resin beads, resulting in generation of resin aggregates. Therefore, the temperature at which addition of the styrene monomers is started in the modification process is preferably from 30 to 70° C. and more preferably from 40 to 65° C.

Moreover, when the amount of styrene monomers added at a temperature of below 80° C., the amount of the styrene monomers added at a temperature of 80° C. or higher, and the amount of the propylene resin beads are denoted by C (% by mass), D (% by mass), and E (% by mass), respectively, it becomes possible, by satisfying the Equations (1) to (3) as described above, to obtain the composite resin beads having a morphology where the disperse phases made of the styrene resin and having relatively small dispersion particle diameters are dispersed in the continuous phase made of the propylene resin. As a result, it becomes possible to obtain the molded article of expanded composite resin beads, which shows an excellent restoring property. Also, when the amount of styrene monomers added at a temperature of below 70° C. is denoted by C (% by mass), it is more preferable that the Equations (1) to (3) are satisfied. And, when the amount of the styrene monomers added at a temperature of below 65° C. is denoted by C (% by mass), it is even more preferable that the Equations (1) to (3) are satisfied.

Thus, in the modification process, it is preferable to employ a multi-step polymerization process in so far as the above Equations (1) to (3) are satisfied.

Further, in the above modification process, the dispersion phases made of the styrene resin and having relatively small dispersion particle diameters are formed by employing a multi-step suspension polymerization process which satisfies the Equations (1) to (3) mentioned above. The reason for this is thought to be as follows.

That is, by increasing the amount of styrene monomers added at a temperature of below 80° C., whereat the suspension does not destabilize and aggregates of the styrene polymer are not formed, polystyrene into which styrene monomers are easily impregnated is formed in the propylene resin beads. Thereat, before diameters of oil droplets of the styrene monomers become large, most of the styrene monomers are impregnated into the nuclear beads made of the propylene resin and is polymerized while the diameters of the oil droplets of the styrene monomers are still small. As a result, it is presumed that the disperse phases made of the styrene polymer and having relatively small dispersion particle diameters are formed.

And, because disperse phases having relatively small dispersion particle diameters are formed as described above, mutual coalescence of the disperse phases of the styrene resin does not occur and the propylene resin and the styrene resin do not form a co-continuous phase even when the disperse phases are stretched by expanding of the composite resin beads. Therefore, it is possible to obtain the expanded composite resin beads having the specific morphology via a expanding process which is a later process.

Furthermore, in the impregnation process, when the glass transition temperature of the styrene resin which constitutes the composite resin beads is denoted as Tg, it is preferable to press the physical blowing agent into a vessel made of the resin beads during polymerization or after polymerization and to impregnate the physical blowing agent into the resin beads in a range of temperature of from Tg (° C.) to Tg+40 (° C.).

By setting the temperature of blowing agent impregnation in the above range, the blowing agent is sufficiently impregnated into the composite resin beads, resulting in good expandability. And, in the expanded composite resin beads obtained, the closed cell ratio becomes high and the restoring property becomes more excellent. Further, it is preferable to set the temperature of the blowing agent impregnation in the above range, also from a viewpoint of preventing coagulation (mutual coalescence of resin beads) of the expandable composite resin beads during impregnation of the blowing agent. The temperature for the blowing agent impregnation is more preferably in the range of from Tg+5 (° C.) to Tg+25 (° C.).

The glass transition temperature (Tg) of the styrene resin can be measured, for example, as follows.

That is, first, 1.0 g of the composite resin beads is added to a flask containing 200 ml of xylene and the flask is heated by means of a mantle heater for 8 hours to carry out Soxhlet extraction. The xylene solution containing the extract is poured into 600 ml of acetone and is subjected to decantation and evaporation to dryness under reduced pressure to obtain a styrene resin as an acetone-soluble matter. With 2 to 4 mg of the styrene resin obtained, a heat-flux differential scanning calorimetry measurement is performed by using a DSC measuring instrument (Type 2010 manufactured by TA Instruments; and the like) under a condition of a steadier heat treatment conducted based on JIS K7121 (1987). And, a middle point-glass transition temperature in the DSC curve measured under a condition of a heating rate of 10° C./min is obtained as the glass transition temperature.

Next, in the expanding process, after obtaining the expandable composite resin beads into which the physical blowing agent is impregnated, it is preferable that the expandable composite resin beads impregnated with the physical blowing agent are heated and expanded by means of a pre-expansion machine and the like.

In addition, as another method for obtaining the expanded beads, there is a method where the composite resin beads and the physical blowing agent are dispersed in a dispersion medium such as water and the like in a closed vessel, the dispersion is heated under stirring to soften the composite resin beads and to impregnate the physical blowing agent into the composite resin beads, and thereafter the composite resin beads impregnated with the physical blowing agent in a softened state are discharged from the closed vessel to a low-pressure (usually atmospheric pressure) environment. However, in this case, there is a fear that, even if the morphology of the expandable resin beads are adjusted as described above, the propylene resin and the styrene resin form a co-continuous phase in the cell wall which forms the expanded beads, and it becomes difficult to obtain a molded article of expanded composite resin beads which has an excellent restoring property.

As the propylene resin used as the nuclear beads, there can be employed the propylene resin which constitutes the continuous phase. From the viewpoints of stiffness, restoring property, and heat resistance, the propylene resin is preferably a random copolymer of propylene and ethylene and/or an α-olefin having 4 to 20 carbon atoms.

Further, the nuclear beads can contain additives such as a cell regulator, a pigment, a slipping agent, an antistatic agent, a flame retardant, and the like.

The additives include, in addition to inorganic materials such as talc, calcium carbonate, silica, titanium oxide, gypsum, zeolite, zinc borate, aluminum hydroxide, carbon, and the like, expanding auxiliaries such as a phosphoric acid-based nucleating agent, a phenol-based nucleating agent, an amine-based nucleating agent, and the like; slipping agents; antistatic agents; flame retardants such as hexabromocyclododecane, tetrabromobisphenol A, trimethyl phosphate, aluminum hydroxide, and the like; flame retardant auxiliaries such as 2,3-dimethyl-2,3-diphenylbutane, antimony trioxide, and the like; coloring agents such as furnace black, channel black, thermal black, acetylene black, Ketchen black, graphite, carbon fiber, and the like. The additives can be added singly or in a combination of two or more.

The nuclear beads can be obtained by melt-kneading the propylene resin by an extruder, followed by pelletization by a strand cut method, a hot cut method, an underwater cut method, and the like. Other methods may be employed as long as they provide a desired bead diameter.

The particle diameter of the nuclear beads is preferably 0.1 to 3.0 mm and more preferably 0.3 to 1.5 mm. In this case, the particle diameter of the composite resin beads obtained is not too small and it is possible to regulate a rate of dissipation of the blowing agent in the expandable composite resin beads to be slower. Also, in this case, productivity of the nuclear beads can be improved and, further, when molding the expanded composite resin beads in a mold, the property thereof to be charged into the mold can be improved. Meanwhile, when pelletizing the resin by using an extruder to produce the nuclear beads, adjustment of the particle diameter can be carried out, for example, by extruding the resin through an opening having a diameter in a range of the particle diameter and cutting the resin to a length in a range of specific particle diameter by changing the cutting speed.

The particle diameter of the nuclear beads can be measured by observing the nuclear beads by means of a micrograph, measuring the maximum diameter of each nuclear bead of 200 or more nuclear beads, and calculating an arithmetic average of the measured maximum diameters.

The nuclear beads are usually suspended in an aqueous medium to obtain a suspension. Dispersion of the beads into an aqueous medium can be carried out by using, for example, a closed vessel equipped with a stirrer. As the aqueous medium, there may be mentioned, for example, deionized water and the like.

For the purposes of stabilizing the suspension and adjusting the particle diameter distribution of the resin beads obtained, the nuclear beads are preferably dispersed in the aqueous medium together with a suspension agent.

As the suspension agent, there can be used particulate inorganic suspension agents such as, for example, tribasic calcium phosphate, hydroxyapatite, magnesium pyrophosphate, magnesium phosphate, aluminum hydroxide, ferric hydroxide, titanium hydroxide, magnesium hydroxide, barium phosphate, calcium carbonate, magnesium carbonate, barium carbonate, calcium sulfate, barium sulfate, talc, kaolin, bentonite, and the like. Also, there can be used organic suspension agents such as, for example, polyvinylpyrrolidone, polyvinyl alcohol, ethyl cellulose, hydroxypropyl methylcellulose, and the like. Preferable are tribasic calcium phosphate, hydroxyapatite, and magnesium pyrophosphate. These suspension agents can be used singly or in a combination of two or more.

The amount of the suspension agent to be used, though it depends on the kind of the suspension agent, is generally 0.05 to 10 parts by mass and preferably 0.3 to 5 parts by mass as a solid relative to 100 parts by mass of the aqueous medium which is water in a slurry containing the reaction product in the suspension polymerization system.

Further, a surfactant can be added to the suspension.

As the surfactant, there can be used, for example, an anionic surfactant, a nonionic surfactant, a cationic surfactant, an amphoteric surfactant, and the like.

As the anionic surfactant, there can be used, for example, sodium alkyl sulfonate, sodium alkylbenzene sulfonate, sodium lauryl sulfate, sodium α-olefin sulfonate, sodium dodecyl phenyl ether disulfonate, and the like.

As the nonionic surfactant, there can be used, for example, polyoxyethylene dodecyl ether, polyoxyethylene nonylphenyl ether, polyoxyethylene lauryl ether, and the like.

As the cationic surfactant, there can be used alkyl amine salts such as coconut amine acetate, stearyl amine acetate, and the like. In addition, there can be used quaternary ammonium compounds such as lauryltrimethylammonium chloride, stearyltrimethylammonium chloride, and the like.

As the above amphoteric surfactant, there can be used alkyl betaines such as lauryl betaine, stearyl betain, and the like. Also, there can be used alkylamine oxides such as lauryldimethylamine oxide and the like.

The surfactants mentioned above may be used singly or in a combination of a plurality thereof.

Preferably, an anionic surfactant is used. More preferably, an alkali metal salt (preferably a sodium salt) of alkyl sulfonic acid having 8 to 20 carbon atoms is used. Herewith, the suspension can be stabilized sufficiently.

Further, to the above suspension, there can be added, if necessary, an electrolyte including inorganic salts such as, for example, lithium chloride, potassium chloride, sodium chloride, sodium sulfate, sodium nitrate, sodium carbonate, sodium bicarbonate, and the like.

Furthermore, in order to obtain a molded article of expanded composite resin beads having excellent toughness and mechanical strength, it is preferable to add a water-soluble polymerization inhibitor to the above suspension.

As the water-soluble polymerization inhibitor, there can be used, for example, sodium nitrite, potassium nitrite, ammonium nitrite, L-ascorbic acid, citric acid, and the like.

The water-soluble polymerization inhibitor is difficult to be impregnated into the nuclear beads and dissolves in the aqueous medium. Therefore, polymerization of the styrene monomers impregnated into the nuclear beads proceeds but polymerization of microdroplets of the styrene monomers in the aqueous medium which had not been impregnated into the nuclear beads, and the styrene monomers near the surface of the nuclear beads which are being absorbed by the nuclear beads can be inhibited. Therefore, it is possible to lower the amount of the styrene resin in the surface portion of the expandable composite resin beads compared to the central portion.

The amount of the water-soluble polymerization inhibitor added is preferably from 0.001 to 0.1 parts by mass and more preferably from 0.002 to 0.02 parts by mass relative to 100 parts by mass of the aqueous medium (refers to all water present in the system including water of the slurry containing the reaction product). When the amount of the water-soluble polymerization inhibitor is too much, the residual styrene monomers increase and there is a fear that a good molded article of expanded composite resin beads becomes unable to be obtained.

As the styrene monomers to be impregnated into the nuclear beads, there can be used the above-mentioned styrene monomers, or styrene monomers and monomer components which are copolymerizable therewith.

In order to polymerize the styrene monomers uniformly in the nuclear beads, the styrene monomers are impregnated into the nuclear beads and are then polymerized. In this case, cross-linking may sometimes occur together with polymerization of the styrene monomers. In the polymerization of the styrene monomers, a polymerization initiator is used and, if necessary, a cross-linking agent can be used together. Further, when a polymerization initiator and/or a cross-linking agent are used, the polymerization initiator and/or the cross-linking agent are preferably dissolved beforehand in the styrene monomers.

As the polymerization initiator, there can be used a polymerization initiator which is used in the suspension polymerization process of the styrene monomers, for example, a polymerization initiator which is soluble in vinyl monomers and has a 10-hour half-life temperature of 50 to 120° C. Specifically, there can be used organic peroxides such as cumene hydroxyperoxide, dicumyl peroxide, t-butyl peroxy-2-ethylhexanoate, t-butyl peroxybenzoate, benzoylperoxide, t-butylperoxyisopropyl carbonate, t-amylperoxy-2-ethylhexyl carbonate, hexylperoxy-2-ethylhexyl carbonate, lauroyl peroxide, and the like; azo compounds such as azobisisobutyronitrile and the like. These polymerization initiators may be used singly or in a combination of two or more.

The polymerization initiator can also be added in a state dissolved in a solvent and can be impregnated into the nuclear beads.

As the solvent for dissolving the polymerization initiator, there can be used, for example, aromatic hydrocarbons such as ethylbenzene, toluene and the like; aliphatic hydrocarbons such as heptane, octane and the like.

The polymerization initiator is preferably used in an amount of from 0.01 to 3 parts by mass with respect to 100 parts by mass of the styrene monomers.

Furthermore, as the cross-linking agent, there can be used a cross-linking agent which does not decompose at the polymerization temperature but decomposes at the crosslinking temperature with a 10 hour half-life temperature which is higher than the polymerization temperature by 5° C. to 50° C. Specifically, there can be used, for example, peroxides such as dicumyl peroxide, 2,5-t-butyl perbenzoate, 1,1-bis-t-butylperoxycyclohexane, and the like. The cross-linking agents may be used singly or in a combination of two or more. The amount of the cross-linking agent mixed is preferably from 0.1 to 5 parts by mass with respect to 100 parts by mass of the styrene monomers.

In addition, as the polymerization initiator and the cross-linking agent, there can also be employed the same compound.

In addition, there can be added to the styrene monomers, if necessary, a plasticizer, an oil-soluble polymerization inhibitor, a flame retardant, a dye, and the like.

As the plasticizer, there can be used aliphatic acid esters such as, for example, glycerin tristearate, glycerin trioctoate, glycerin trilaurate, sorbitan tristearate, sorbitan monostearate, butyl stearate, and the like. Also, there can be used acetylated monoglycerides such as glycerin diacetomonolaurate and the like; oils and fats such as hardened beef tallow, hydrogenated castor oil, and the like; organic compounds such as cyclohexane, liquid paraffins, and the like.

As the oil-soluble polymerization inhibitor, there can be used, for example, p-t-butylcatechol, hydroquinone, benzoquinone, and the like.

Furthermore, there can be added a cell regulator to the styrene monomers or the solvent.

As the cell regulator, there may be used, for example, an aliphatic monoamide, a fatty acid bisamide, talc, silica, polyethylene wax, methylenebis (stearic acid), a methyl methacrylate copolymer, silicone, and the like.

As the aliphatic monoamide, there can be used, for example, oleic acid amide, stearic acid amide, and the like.

As the fatty acid bisamide, there can be used, for example, ethylene bis-stearic acid amide and the like.

The cell regulator is preferably used in the amount of from 0.01 to 2 parts by mass with respect to 100 parts by mass of the styrene monomers.

Addition of the styrene monomers (if necessary, contains the polymerization initiator and/or the cross-linking agent therein) to be added when a styrene-based monomers are impregnated into the nuclear particles and polymerized, is preferably performed in portions as described above.

The polymerization temperature, which may vary depending on the kind of the polymerization initiator used, is preferably 60 to 105° C. Furthermore, the cross-linking temperature, which may vary depending on the kind of the cross-linking agent, is preferably 100 to 150° C.

The physical blowing agent is preferably an organic physical blowing agent having a boiling point of 80° C. or lower.

As the organic physical blowing agent having a boiling point of 80° C. or lower, there may be used saturated hydrocarbon compounds such as methane, ethane, propane, n-butane, isobutane, cyclobutane, n-pentane, isopentane, neopentane, cyclopentane, n-hexane, cyclohexane, and the like; lower alcohols such as methanol, ethanol, and the like; ether compounds such as dimethyl ether, diethyl ether, and the like. These blowing agents may be used singly or as a mixture of two or more.

Moreover, insofar as the objects and effects of the present invention are not interfered with, there can be used inorganic physical blowing agents such as carbon dioxide, nitrogen, air, and the like.

The amount of the physical blowing agent to be added, though it varies depending on the intended expansion ratio and the kind of the blowing agent, is generally from 5 to 30 parts by mass and preferably from 7 to 20 parts by mass with respect to 100 parts by mass of the composite resin beads. Meanwhile, when the amount of the physical blowing agent is too small, there is a fear that the desired expansion ratio is not obtained; and when the amount thereof is too much, there is a fear that the expanded composite resin beads shrink and a molded article of expanded composite resin beads having good stiffness is not obtained.

After impregnation with the physical blowing agent, the expandable composite resin beads are dehydrated and dried, and, if necessary, are coated with a surface coating agent.

The surface coating agent includes, for example, zinc stearate, stearic acid triglyceride, stearic acid monoglyceride, hydrogenated castor oil, an antistatic agent, and the like. The amount of the surface coating agent to be added is preferably from 0.01 to 2 parts by mass with respect to 100 parts by mass of the expandable composite resin beads.

Furthermore, a molded article of expanded composite resin beads can be obtained by molding the expanded composite resin beads in a mold by widely known molding means. In addition, in the obtained molded article of expanded composite resin beads, the density, the closed cell ratio, and the fusion ratio are preferably from 10 to 200 kg/m$^3$, 70% or more, 60% or more, respectively.

When the density, the closed cell ratio, and the fusion ratio are within the above-described ranges, mechanical strength such as compression property of the molded article of expanded composite resin beads is more improved and density fluctuation becomes smaller. Further, the density of the molded article of expanded composite resin beads is more preferably from 15 to 100 kg/m$^3$. Also, the fusion ratio in the molded article of the expanded beads is more preferably from 65 to 100% and even more preferably from 70 to 95%. Furthermore, the closed cell ratio of the molded article of the expanded beads is more preferably 80% or more.

The density of the molded article of expanded composite resin beads can be measured in the following manner.

That is, first, a test piece of 100 mm length×20 mm width×20 mm thickness is cut from a molded article of expanded composite resin beads, which has been left for 24 hours or more in an environment of a temperature of 23° C. and relative humidity of 50% and, from the outside dimension of the test piece, the bulk volume (100×20×20 (mm$^3$)) is calculated. Subsequently, the weight (g) of the test piece is weighed precisely. By dividing the weight of the test piece obtained as above by the bulk volume of the test piece and by performing a unit conversion, the density (kg/m$^3$) of the molded article of expanded composite resin beads can be obtained.

Furthermore, the fusion ratio in the molded article of expanded composite resin beads can be measured in the following manner.

That is, first, a test piece of 150 mm length×75 mm width×25 mm thickness is cut from a molded article of expanded composite resin beads which has been left for 24 hours or more in an environment of a temperature of 23° C. and a relative humidity of 50%. On one surface of the test piece (one of the two surfaces of 150 mm in length and 25 mm in width) at the central portion in the longitudinal direction, a 2 mm deep incision was made across the full width.

Then, in a direction to widen the incision, the test piece is bent until the test piece fractures or the both ends of the test piece come into contact. Subsequently, the fractured surface of the test piece is observed and the numbers of the expanded beads which fractured internally and those which were peeled off at the interface are visually counted. Then, the proportion of the number of expanded beads which fractured internally with respect to the total number of the expanded beads which fractured internally and those which were peeled off at the interface can be obtained by calculation. In addition, when the test piece does not fracture even when the test piece is bent until both ends thereof come in contact, the fusion ratio is taken as 100%.

Furthermore, the closed cell ratio of the molded article of expanded composite resin beads can be measured in the following manner.

That is, first, a test piece of 30 mm length×30 mm width×20 mm thickness is cut from a molded article of expanded composite resin beads, which has been left for 24 hours or more in an environment of a temperature of 23° C. and a relative humidity of 50%. Then, by using the volume of the test piece, $V_1$ (cm$^3$), obtained by an air comparison pycnometer (air comparison pychnometers such as Air Comparison Pycnometer Model 1000 manufactured by Tokyoscience. Co., Ltd., and the like); the apparent volume, $V_2$ (cm$^3$), obtained by multiplying the outside dimension of length, width, and thickness; the weight of the test piece, W (g); and the true density, d (g/cm$^3$), of the composite resin, the closed cell ratio can be obtained by calculation according to the following equation:

$$\text{closed cell ratio}(\%) = (V_1 - W/d)/(V_2 - W/d) \times 100$$

Meanwhile, as the true density, d, of the composite resin, the value obtained in the following manner is used. After drying the expanded composite resin beads at 120° C. for 4 hours, a film is prepared by hot pressing thereof, and the weight of the film, $W_3$ (g) and the volume of the test piece, $V_3$ (cm$^3$) determined by a water displacement method are measured and then the weight of the film, $W_3$ (g) is divided by the volume of the test piece, $V_3$, determined by the water displacement method to obtain the value as the true density.
Embodiment

EXAMPLE 1

In the present example, expanded composite resin beads are prepared and, by using these, a molded article of expanded composite resin beads is produced.

In FIG. 1, there is schematically shown the state of dispersion of a propylene resin (continuous phase) and a styrene resin (disperse phases) in a cell wall which constitutes the central portion of a expanded composite resin beads pertaining to the Example. As shown in the figure, in the cell wall 1 of the expanded composite resin beads, the base resin is a composite resin having a large number of disperse phases 3 made of a styrene resin, which are dispersed in a continuous phase 2 made of a propylene resin.

Hereinafter, the process for producing the expanded composite resin beads of the present example will be described.
(1) Preparation of Nuclear Beads As the polypropylene resin (PP), there is used a propylene-ethylene random copolymer, "F-794NV" (melting point, 135° C.), produced by Prime Polymer Co., Ltd. This polypropylene resin was fed to an extruder and was melt-kneaded at a temperature of 230° C. Thereafter, the melt-kneaded polymer was received as strands through a die having 16 nozzles with 1 mm diameter, the die being provided at the tip of the extruder. Subsequently, the strands were cooled and cut to a desired length to produce minipellets having an average weight of 0.6 mg/bead, which were used as nuclear beads. The grade and the melting point of the polypropylene resin are shown in the after-mentioned Table 1.
(2) Preparation of Expandable Composite Resin Beads To an autoclave with an inner volume of 3 L equipped with a stirrer, 1000 g of deionized water was added and, further, 6.0 g of sodium pyrophosphate was added thereto and dissolved. Thereafter, 12.9 g of powdery magnesium nitrate 6-hydrate was added and the mixture was stirred at room temperature for 30 minutes to synthesize a magnesium pyrophosphate slurry.

After synthesis of the magnesium pyrophosphate slurry, 5.0 g of sodium lauryl sulfonate (a 10% aqueous solution) as a surfactant and 400 g of the above-described nuclear beads were added to this reaction product slurry and the mixture was stirred at 500 rpm. Subsequently, after replacing the air inside the autoclave with nitrogen, heating of the mixture was started and the temperature was raised to 60° C. over a period of 30 minutes. The mixture was maintained at this temperature of 60° C. for 40 minutes.

When the temperature reached 60° C., a solution of 0.5 g of dicumyl peroxide ("Percumyl D" produced by NOF Corporation) as a polymerization initiator dissolved in 300 g of styrene was added into the autoclave over a period of 30 minutes. Subsequently, the temperature was raised to 130° C. over a period of 1 hour and 30 minutes, maintained at this temperature of 130° C. for 2 hours, and thereafter the reaction mixture was cooled to a temperature of 120° C. over a period of 30 minutes. After cooling, the reaction mixture was maintained at this temperature of 120° C. for 3 hour and 30 minutes.

When the temperature reached 120° C., a solution of 1.5 g of dicumyl peroxide ("Percumyl D" produced by NOF Corporation) as a polymerization initiator dissolved in 300 g of styrene was added into the autoclave over a period of 2 hour and 30 minutes. Further, the temperature was raised to 130° C. over a period of 1 hour and the reaction mixture was maintained at this temperature of 130° C. for 5 hours. Thereafter, the mixture was cooled to a temperature of 30° C. over a period of 6 hours. After cooling, the content was taken out and was thereafter dehydrated and washed by means of a centrifuge. Furthermore, by removing moisture adhered to the surface by means of a flash dryer, there were obtained the composite resin beads.

Next, to an autoclave with an inner volume of 3 L equipped with a stirrer, 1000 g of deionized water, 5.0 g of tribasic calcium phosphate, 5 g of a 1% aqueous solution of sodium alkyl diphenyl ether disulfonate ("Pellex SSH" produced by Kao Corporation), and 500 g of the composite resin beads were added and the mixture was stirred at 400 rpm.

After replacing the air inside the autoclave with nitrogen, heating of the mixture was started, the temperature was raised to 90° C. over a period of 1 hour and 30 minutes, and the mixture was maintained at this temperature of 90° C. for 3 hours. And, when the temperature reached 90° C., 75 g of butane (a mixture of 20% by volume of n-butane and 80% by volume of isobutane) as a blowing agent was added into the autoclave over a period of 30 minutes. Further, the temperature was raised to a temperature of 105° C. over a period of 1 hour and the mixture was maintained as it is at a temperature of 105° C. for 5 hours. Thereafter, the mixture was cooled to a temperature of 30° C. over a period of 6 hours.

After cooling, the content was taken out and magnesium pyrophosphate adhered on the surface of the resin beads was dissolved by addition of nitric acid. Thereafter, the content was dehydrated and washed by means of a centrifuge, and the moisture adhered to the surface was removed by means of a flash dryer to obtain the expandable composite resin beads having an average particle diameter (d63) of 1.3 mm.

The expandable composite resin beads obtained were sifted and beads having diameters between 0.7 to 2.0 mm were taken out. And, these expandable composite resin beads were further coated with mixture containing 0.2 part by mass of zinc stearate and 0.01 part by mass of N,N-bis(2-hydroxyethyl)alkylamine as an antistatic agent, with respect to 100 parts by mass of these expandable composite resin beads.

Figure 2:
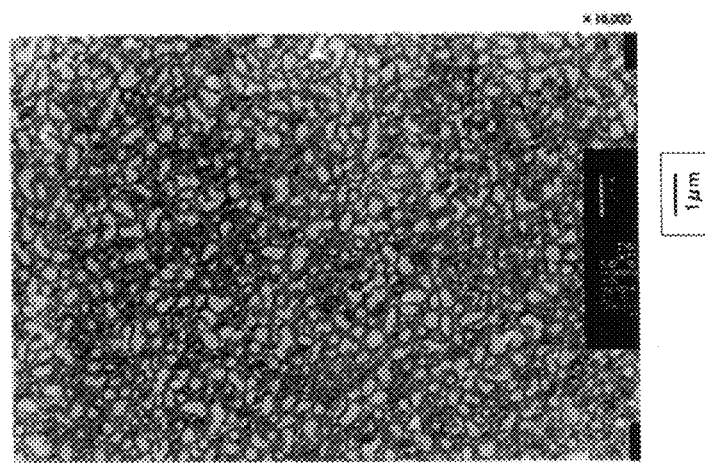

In addition, a transmission electron micrograph (magnification: ×10000) of the central portion of a expandable composite resin bead obtained in the present example is shown in FIG. 2. As shown in FIG. 2, the disperse phases made of the styrene resin have DMAX$_{ave}$ of 1 μm or less and are dispersed in a continuous phase made of the propylene resin.

Meanwhile, the glass transition temperature (Tg) (° C.) of the styrene resin, the blend ratio of the polypropylene resin and the polystyrene resin (mass ratio; PP/PS), the blending method, the kind of the blowing agent, and the temperature of impregnation of the blowing agent are shown in the after-mentioned Table 1. The glass transition temperature of the styrene resin was measured by the above-mentioned method. Also, when the amount of styrene monomers (SM1) added at a temperature of below 80° C., the amount of styrene monomers (SM2) added at 80° C. or higher, and the amount of propylene resin beads (PP) are denoted by C (% by mass), D (% by mass), and E (% by mass), respectively, the values of C, C/E, C/(C+D+E), and C/D are shown in the after-mentioned Table 1.

(3) Preparation of Expanded Composite Resin Beads

Next, using the expandable composite resin beads obtained as above, expanded composite resin beads having an apparent density of 33.3 kg/m$^3$ were prepared.

Figure 3:
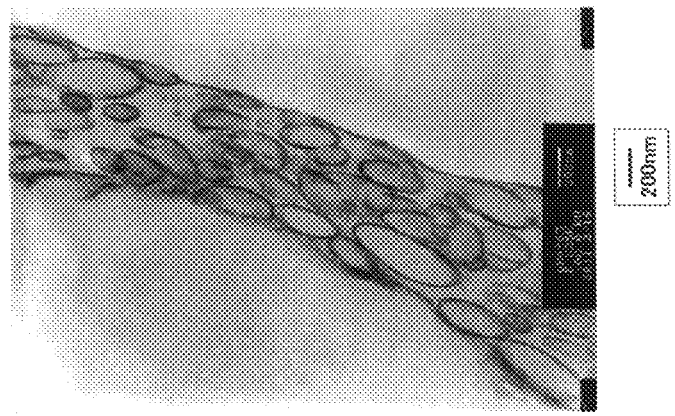
FIG. 3 A photograph substituting for a drawing, which pertains to Example 1 and shows an observation of a cross-section of a cell wall at the central portion of an expanded composite resin bead by a transmission electron microscope (magnification: ×50000).

Specifically, first, 500 g of the expandable composite resin beads obtained as above were charged to a pressurized expanding machine (Type: J-045) manufactured by DAISEN Co., Ltd. Then, steam was supplied so that the temperature inside the vessel in this expanding machine became 110° C. and the expandable composite resin beads were heated for 60 seconds. By doing so, the expandable modified composite resin beads were expanded to an apparent density of 33.3 kg/m$^3$ to obtain expanded composite resin beads having an apparent expansion ratio of 30. A transmission electron micrograph (magnification: ×50000) of a cell wall which constitutes the central portion of a expanded composite resin bead obtained in the present example is shown in FIG. 3.

Further, the apparent density (kg/m$^3$) of the expanded composite resin beads can be measured in the following manner. That is, first, the expanded composite resin beads were left for 10 days in a constant temperature room under conditions of atmospheric pressure, 50% relative humidity, and 23° C. Then, a 1 L measuring cylinder was prepared and, to the empty measuring cylinder were added the expanded composite resin beads, which had been left in the constant temperature room for 10 days, up to the 1 L gauge line and the weight of the expanded beads added into the measuring cylinder was measured. The apparent density (kg/m$^3$) of the expanded composite resin beads was calculated by converting the unit of the weight of the expanded beads per apparent volume of 1 L as measured by this procedure. In addition, the apparent expansion ratio of the expanded composite resin beads was calculated as (1000/apparent density (kg/m$^3$)).

In the after-mentioned Table 1, regarding the expanded composite resin beads, there are shown the expanding method, the kind of resin which constitutes the continuous phase in the cell wall, the kind of resin which constitutes the disperse phase, the weight-average molecular weight (Mw) of the styrene resin (PS), and the content of the blowing agent. The weight-average molecular weight and the content of the blowing agent were measured by the above-mentioned methods.

<DMAX$_{ave}$ and DMIN$_{ave}$ of Disperse Phases>

The DMAX$_{ave}$ and DMIN$_{ave}$ of the disperse phases in the cell wall which constitutes the expanded composite resin beads can be measured by performing the following operations.

Specifically, first, a sample for observation was cut from the central portion of an expanded composite resin bead. Subsequently, the sample for observation is embedded in an epoxy resin and dyed with ruthenium tetroxide, followed by preparation of an ultrathin section by means of an ultramicrotome. This ultrathin section was placed on a grid and morphology of the internal cross-section of the expanded composite resin bead was observed by a transmission electron microscope (JEM 1010 manufactured by JEOL Ltd.). Then, based on a micrograph of 50000 times magnification, the maximum and minimum diameters of each disperse phase are measured. And, five expandable beads were randomly selected from a group of expanded composite resin beads to be used for molding and, in the cross-section micrograph of the central portion of each of the expanded composite resin beads, 20 disperse phases were selected randomly and the maximum and minimum diameters of each of them were measured. Then, arithmetic averages of 100 values for the maximum diameters and the minimum diameters each were obtained. These were taken as the DMAX$_{ave}$ and DMIN$_{ave}$ of the disperse phases. The results are shown in the after-mentioned Table 1.

(4) Preparation of Molded Article of Expanded Composite Resin Beads

The expanded composite resin beads obtained as above were aged at room temperature for one day. Thereafter, the expanded composite resin beads were charged into a planar mold of 250 mm length×200 mm width×50 mm thickness and molding was performed to obtain a molded article of expanded composite resin beads by using a molding machine (D-30SF manufactured by DAISEN Co., Ltd.). Molding was conducted by heating under a prescribed pressure (for example, steam pressure of 0.22 MPa (gauge pressure)) for 10 seconds, cooling with water after the pressure was returned to atmospheric pressure, and opening the mold when the contact pressure meter reached 0.02 MPa (gauge pressure) to demold the molded article of expanded composite resin beads. In addition, cooling time (sec) required from the start of steam heating to water cooling until the contact pressure reached 0.02 MPa (gauge pressure) was measured. After the molded article obtained was dried at 40° C. for 1 day, it was further conditioned for 1 day or longer at room temperature. The molding pressure (MPa) and the molding cycle (sec) at the time of molding are shown in the after-mentioned Table 1.

Furthermore, the density (kg/m$^3$) of the molded article of expanded composite resin beads was calculated by dividing the mass of the molded article of expanded composite resin beads by the volume of the molded article. The result is shown in Table 1.

Next, with the molded article of expanded composite resin beads, compressive stress, heat resistance, compression set, closed cell ratio, internal fusion ratio were measured in the following manner. The results are shown in the after-mentioned Table 1.

<Compressive Stress>

A test piece of 50 mm length×50 mm width×25 mm thickness was cut from the molded article of expanded composite resin beads and a compression test was conducted according to JIS K7220 (2006). In addition, the compressive stress when the compressive deformation is 10% is referred to as the 10% deformation compressive stress and that at compressive deformation of 50% is referred to as the 50% deformation compressive stress.

<Heat resistance>

A test piece of 50 mm length ×50 mm width ×25 mm thickness was cut from the molded article of expanded composite resin beads and the test piece was heated at a temperature of 80° C. for 22 hours. And, with the test piece before and after the heating, the ratios (%) [a dimension (before the heating) / a dimension (before the heating) ×100] of dimensional changes in length, width, and thickness were measured respectively, and, among the absolute values of the ratios (%) of the dimensional changes in each of length, width, and thickness, the largest value was taken as the result of evaluation of heat resistance.

<Compression Set>

A test piece of 50 mm length×50 mm width×25 mm thickness was cut from the molded article of expanded composite resin beads and the compression set was measured according to JIS K6767 (1999).

<Closed Cell Ratio>

A test piece of 30 mm length×30 mm width×20 mm thickness was cut from the molded article of expanded composite resin beads and the closed cell ratio was obtained by using an air comparison pycnometer (Air Comparison Pycnometer Model 1000 manufactured by Tokyoscience Co., Ltd.) and calculating according to the aforementioned procedures.

<Fusion Ratio>

A test piece of 150 mm length×75 mm width×25 mm thickness was cut from the molded article of expanded composite resin beads and the fusion ratio was calculated by the aforementioned method.

EXAMPLE 2

The composite resin beads were obtained in the same manner as in Example 1 except that, in the modification process to obtain the composite resin beads, the amounts of styrene monomers added at 60° C. and 120° C. were changed to 400 g and 200 g, respectively. Subsequently, from the composite resin beads obtained, the expandable composite resin beads, the expanded composite resin beads, and the molded article of expanded composite resin beads were obtained in the same manner as in Example 1.

In Example 2 also, the same evaluation as in Example 1 was carried out and the results are shown in Table 1.

EXAMPLE 3

The composite resin beads were obtained in the same manner as in Example 1 except that, in the modification process to obtain the composite resin beads, 300 g of the polypropylene resin nuclear beads were added and the amounts of styrene monomers added at 60° C. and at 120° C. were changed to each 350 g. Subsequently, from the composite resin beads obtained, the expandable composite resin beads, the expanded composite resin beads, and the molded article of expanded composite resin beads were obtained in the same manner as in Example 1. In Example 3 also, the same evaluation as in Example 1 was carried out and the results are shown in Table 1.

Figure 4:
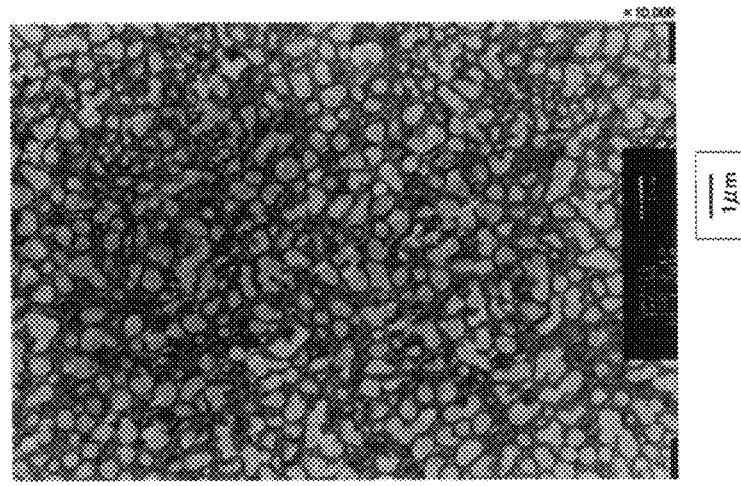
FIG. 4 A photograph substituting for a drawing, which pertains to Example 3 and shows an observation of a cross-section of the central portion of an expandable composite resin bead by a transmission electron microscope (magnification: ×10000).

Furthermore, a transmission electron micrograph (magnification: ×10000) of the central portion of an expandable composite resin bead obtained in the present example is shown in FIG. 4. As is shown FIG. 4, the disperse phases made of the styrene resin have $DMAX_{ave}$ of 1 µm or less and are dispersed in a continuous phase made of the propylene resin.

EXAMPLE 4

The composite resin beads were obtained in the same manner as in Example 1 except that, in the modification process to obtain the composite resin beads, the amounts of styrene monomers added at 60° C. and at 120° C. were changed to 500 g and 200 g, respectively. Subsequently, from the composite resin beads obtained, the expandable composite resin beads, the expanded composite resin beads, and the molded article of expanded composite resin beads were obtained in the same manner as in Example 1. In Example 4 also, the same evaluation as in Example 1 was carried out and the results are shown in Table 1.

EXAMPLE 5

The composite resin beads were obtained in the same manner as in Example 1 except that, in the modification process to obtain the composite resin beads, 250 g of the polypropylene resin nuclear beads were added and the amount of styrene monomers added at 60° C. was changed to 450 g. Subsequently, from the composite resin beads obtained, the expandable composite resin beads, the expanded composite resin beads, and the molded article of expanded composite resin beads were obtained in the same manner as in Example 1. In Example 5 also, the same evaluation as in Example 1 was carried out and the results are shown in Table 1.

EXAMPLE 6

The composite resin beads were obtained in the same manner as in Example 1 except that the nuclear particles were prepared by using a propylene-ethylene copolymer (trade name: "WFX4T," melting point 125° C.) produced by Japan Polypropylene Corporation as the propylene resin for nuclear beads and that, in the modification process to obtain the composite resin beads, 300 g of the nuclear beads were added and the amounts of styrene monomers added at 60° C. and at 120° C. were changed to each 350 g. Subsequently, from the composite resin beads obtained, the expandable composite resin beads, the expanded composite resin beads, and the molded article of expanded composite resin beads were obtained in the same manner as in Example 1. In Example 6 also, the same evaluation as in Example 1 was carried out and the results are shown in Table 2.

EXAMPLE 7

First, the nuclear beads were prepared in the same manner as in Example 1 except that a polypropylene resin "WFX4T" (melting point 125° C.) produced by Japan Polypropylene Corporation was used as the resin for the nuclear beads.

Next, to an autoclave with an inner volume of 3 L equipped with a stirrer, 1000 g of deionized water was added and, further, 6.0 g of sodium pyrophosphate was added thereto and dissolved. Thereafter, 12.9 g of powdery magnesium nitrate 6-hydrate was added and the mixture was stirred at room temperature for 30 minutes to synthesize magnesium pyrophosphate as a slurry.

After synthesis of magnesium pyrophosphate as a slurry, 5.0 g of sodium lauryl sulfonate (a 10% aqueous solution) as a surfactant and 400 g of the polypropylene resin nuclear beads were added to this reaction product slurry and the mixture was stirred at 500 rpm. Subsequently, after the air inside the autoclave was replaced with nitrogen, heating of the mixture was started and the temperature was raised to 60° C. over a period of 30 minutes. The reaction mixture was maintained at this temperature of 60° C. for 40 minutes.

When the temperature reached 60° C., a solution of 0.5 g of dicumyl peroxide ("Percumyl D" produced by NOF Corporation) as a polymerization initiator dissolved in 300 g of styrene was added into the autoclave over a period of 30 minutes.

Then, the temperature of the reaction mixture was raised to 120° C. over a period of 1 hour and 30 minutes, maintained at this temperature of 120° C. for 2 hours, and thereafter the mixture was cooled to a temperature of 110° C. over a period of 30 minutes. After cooling, the reaction mixture was maintained at this temperature of 110° C. for 3 hour and 30 minutes.

When the temperature reached 110° C., a solution of 1.5 g of dicumyl peroxide ("Percumyl D" produced by NOF Corporation) as a polymerization initiator dissolved in 300 g of styrene was added into the autoclave over a period of 2 hour and 30 minutes. Further, the temperature was raised to 120° C. over a period of 1 hour and the reaction mixture was maintained at this temperature of 120° C. for 5 hours. Thereafter, the mixture was cooled to 30° C. over a period of 6 hours. After cooling, the content was taken out and was, by means of a centrifuge, dehydrated and washed. By removing moisture adhered to the surface by means of a flash dryer, there were obtained the composite resin beads.

Subsequently, from the composite resin beads obtained, the expandable composite resin beads, the expanded composite resin beads, and the molded article of expanded composite resin beads were obtained in the same manner as in Example 1. In Example 7 also, the same evaluation as in Example 1 was carried out and the results are shown in Table 2.

EXAMPLE 8

In the present example, the expanded composite resin beads having an apparent density of 20.0 kg/m$^3$ were prepared using the expandable composite resin beads obtained in Example 1.

Specifically, first, the expandable resin beads obtained in the same manner as in Example 1 were charged into a pressurized expanding machine (Type: J-045) manufactured by DAISEN Co., Ltd. Then, steam was supplied so that the temperature inside the vessel in this expanding machine became 110° C. and heating was continued for 90 seconds. By doing so, the expandable composite resin beads were expanded to an apparent density of 20.0 kg/m$^3$ to obtain expanded composite resin beads having an apparent expansion ratio of 50. Subsequently, from the expanded composite resin beads obtained, the molded article of expanded composite resin beads was obtained in the same manner as in Example 1. In Example 8 also, the same evaluation as in Example 1 was carried out and the results are shown in Table 2.

EXAMPLE 9

In the present example, the expanded beads having an apparent density of 50.0 kg/m$^3$ were prepared using the expandable composite resin beads obtained in Example 1.

Specifically, first, the expandable composite resin beads obtained in the same manner as in Example 1 were charged into a pressurized expanding machine (Type: J-045) manufactured by DAISEN Co., Ltd. Then, steam was supplied so that the temperature inside the vessel in this expanding machine became 110° C. and heating was continued for 30 seconds. By doing so, the expandable composite resin beads were foamed to an apparent density of 50.0 kg/m$^3$ to obtain expanded composite resin beads having an apparent expansion ratio of 20. Subsequently, from the expanded composite resin beads obtained, the molded article of expanded composite resin beads was obtained in the same manner as in Example 1. In Example 9 also, the same evaluation as in Example 1 was carried out and the results are shown in Table 2.

Meanwhile, in the above-described expanded composite resin beads of Examples 1 to 9, the cross-sectional shapes of the disperse phases dispersed in the continuous phase are all elliptical.

COMPARATIVE EXAMPLE 1

First, the composite resin beads were prepared in the same manner as in Example 1. Then, 1 kg of the composite resin beads obtained was charged into a 5 L closed vessel (pressure vessel) equipped with a stirrer together with 3.5 L of water as a dispersion medium. Further, 5 g of kaolin as a dispersant and 0.6 g of sodium alkylbenzene sulfonate as a surfactant were added into the dispersion medium.

Subsequently, while stirring at a rotating speed of 300 rpm, 4 parts by mass of carbon dioxide as a blowing agent per 100 parts by mass of the composite resin beads was pressed in the closed vessel, and the temperature was raised under stirring to an impregnation temperature of 165° C. and the mixture was maintained at that temperature for 20 minutes. Thereafter, by discharging the content to the atmospheric pressure, the expanded composite resin beads having an apparent density of 33.3 kg/m$^3$ were obtained. Next, from the expanded composite resin beads obtained, the molded article of expanded composite resin beads was obtained in the same manner as in Example 1.

Figure 5:
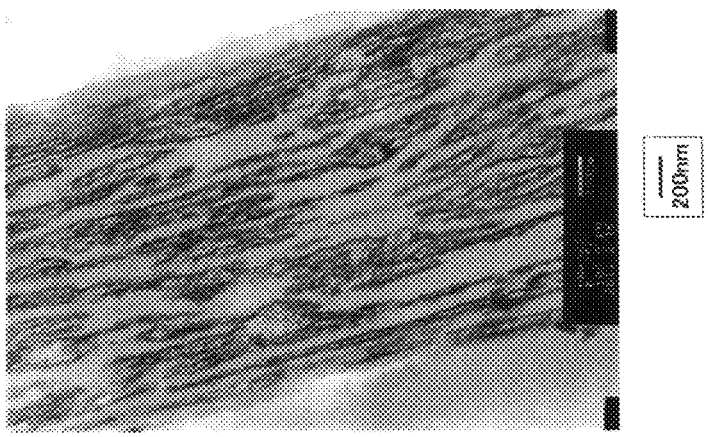
FIG. 5 A photograph substituting for a drawing, which pertains to Comparative Example 1 and shows an observation of a cross-section of a cell wall at the central portion of an expanded composite resin bead by a transmission electron microscope (magnification: ×50000).

A transmission electron micrograph (magnification ratio: ×50000) of a cell wall which constitutes the central portion of the expanded composite resin bead obtained in the present example is shown in FIG. 5. In Comparative Example 1 also, the same evaluation as in Example 1 was carried out and the results are shown in Table 3.

COMPARATIVE EXAMPLE 2

First, the composite resin beads were prepared in the same manner as in Example 1. Then, 1 kg of the composite resin beads obtained was charged into a 5 L closed vessel (pressure vessel) equipped with a stirrer together with 3.5 L of water as a dispersion medium. Further, 5 g of kaolin as a dispersant and 0.6 g of sodium alkylbenzene sulfonate as a surfactant were added into the dispersion medium.

Subsequently, while stirring at a rotating speed of 300 rpm, 4 parts by mass of butane (a mixture of 20% by volume of n-butane and 80% by volume of isobutane) as a blowing agent per 100 parts by mass of the composite resin beads was pressed in the closed vessel, and the temperature was raised under stirring to an impregnation temperature of 165° C. and the mixture was maintained at that temperature for 20 minutes. Thereafter, by discharging the content to the atmospheric pressure, the expanded composite resin beads having an apparent density of 33.3 kg/m$^3$ were obtained. Next, from the expanded composite resin beads obtained, the molded article of expanded composite resin beads was obtained in the same manner as in Example 1.

Figure 6:
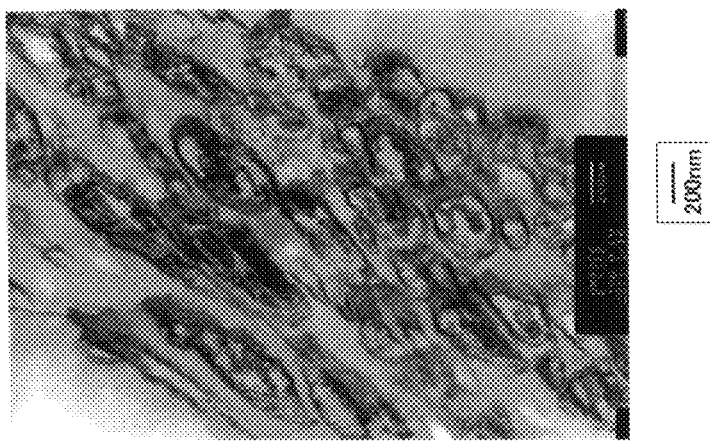
FIG. 6 A photograph substituting for a drawing, which pertains to Comparative Example 2 and shows an observation of a cross-section of a cell wall at the central portion of an expanded composite resin bead of by a transmission electron microscope (magnification: ×50000).

A transmission electron micrograph (magnification: ×50000) of a cell wall which constitutes the central portion of a expanded composite resin bead obtained in the present example is shown in FIG. 6. In Comparative Example 2 also, the same evaluation as in Example 1 was carried out and the results are shown in Table 3.

COMPARATIVE EXAMPLE 3

In the present example, first, nuclear beads were prepared in the same manner as in Example 1 except that, as the resin for the nuclear beads, 3 kg of a propylene-ethylene copolymer (trade name: "F-794NV," melting point 135° C.) produced by Prime Polymer Co., Ltd. and 7 kg of polystyrene (trade name: "679") produced by PS Japan Corporation were fed to an extruder.

Next, into an autoclave with an inner volume of 3 L equipped with a stirrer, 1000 g of deionized water, 5.0 g of tribasic calcium phosphate, 5 g of a 1% aqueous solution of sodium alkyl diphenyl ether disulfonate ("Pellex SSH" produced by Kao Corporation), and 500 g of the resin nuclear beads were charged and the mixture was stirred at 400 rpm.

After the air inside the autoclave was replaced with nitrogen, heating of the mixture was started and the temperature was raised to 90° C. over a period of 1 hour and 30 minutes. The mixture was maintained at this temperature of 90° C. for 3 hours. And, when the temperature reached 90° C., 75 g of butane (a mixture of 20% by volume of n-butane and 80% by volume of isobutane) as a blowing agent was added into the autoclave over a period of 30 minutes. Further, the temperature was raised to 105° C. over a period of 1 hour and the mixture was maintained as it is at a temperature of 105° C. for 5 hours. Thereafter, the mixture was cooled to a temperature of 30° C. over a period of 6 hours.

After cooling, the content was taken out and magnesium pyrophosphate adhered on the surface of the resin beads was dissolved by addition of nitric acid. Thereafter, the content was dehydrated and washed by means of a centrifuge, followed by removal of moisture adhered to the surface by means of a flash dryer to obtain the expandable composite resin beads. Next, from the expandable composite resin beads obtained, the expanded composite resin beads and the molded article of expanded composite resin beads were obtained in the same manner as in Example 1.

Figure 7:
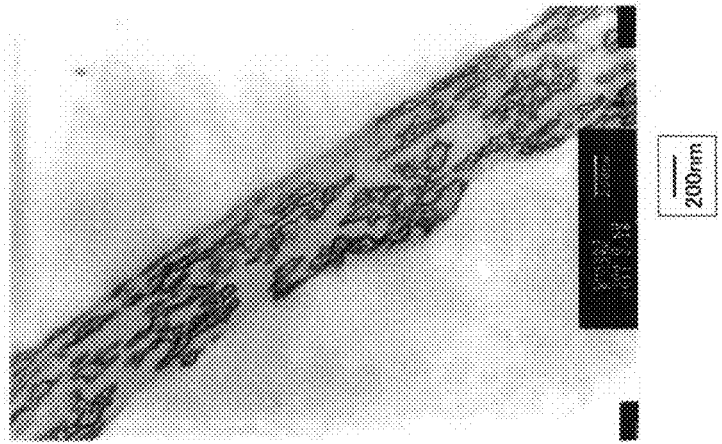
FIG. 7 A photograph substituting for a drawing, which pertains to Comparative Example 3 and shows an observation of a cross-section of a cell wall at the central portion of an expanded composite resin bead by a transmission electron microscope (magnification: ×50000).
Figure 8:
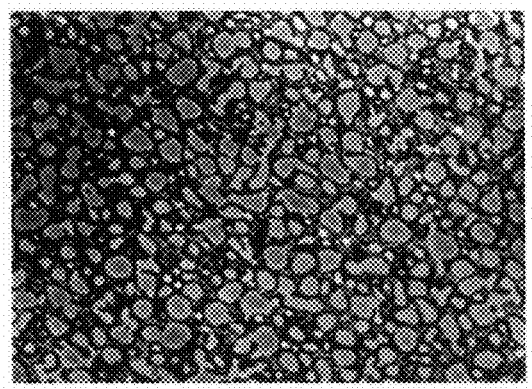
FIG. 8 A photograph substituting for a drawing, which pertains to Comparative Example 3 and shows an observation of a cross-section of the central portion of an expandable composite resin bead by a transmission electron microscope (magnification: ×10000).

A transmission electron micrograph (magnification ratio: ×50000) of a cell wall which constitutes the central portion of a expanded composite resin bead obtained in the present example is shown in FIG. 7. In addition, a transmission electron micrograph (magnification ratio: ×10000) of the central portion of the expandable resin bead obtained in the present example is shown in FIG. 8. In Comparative Example 3 also, the same evaluation as in Example 1 was carried out and the results are shown in Table 3.

COMPARATIVE EXAMPLE 4

In the present example, first, to an autoclave with an inner volume of 3 L equipped with a stirrer, 1000 g of deionized water was added and, further, 6.0 g of sodium pyrophosphate was added thereto and dissolved. Thereafter, 12.9 g of powdery magnesium nitrate 6-hydrate was added and the mixture was stirred at room temperature for 30 minutes to synthesize a magnesium pyrophosphate slurry.

After synthesis of the magnesium pyrophosphate slurry, 5.0 g of sodium lauryl sulfonate (a 10% aqueous solution) as a surfactant and 400 g of the polypropylene resin nuclear beads were added to this reaction product slurry and the mixture was stirred at 500 rpm. Subsequently, after the air inside the autoclave was replaced with nitrogen, heating of the mixture was started, and the temperature was raised to 60° C. over a period of 30 minutes and the mixture was maintained at this temperature of 60° C. for 30 minutes.

When the temperature reached 60° C., a solution of 0.4 g of dicumyl peroxide ("Percumyl D" produced by NOF Corporation) as a polymerization initiator dissolved in 200 g of styrene was added into the autoclave over a period of 30 minutes.

Then, the temperature of the reaction mixture was raised to 135° C. over a period of 1 hour and 30 minutes, and the mixture was maintained at this temperature of 135° C. for hours and thereafter cooled to a temperature of 120° C. over a period of 30 minutes. After cooling, the reaction mixture was maintained at this temperature of 120° C. for 5 hours.

When the temperature reached 120° C., a solution of 1.8 g of dicumyl peroxide ("Percumyl D" produced by NOF Corporation) as a polymerization initiator dissolved in 400 g of styrene was added into the autoclave over a period of 4 hours.

Further, the temperature was raised to 140° C. over a period of 1 hour and the reaction mixture was maintained at this temperature of 140° C. for 3 hours. Thereafter, the mixture was cooled to a temperature of 30° C. over a period of 6 hours.

After cooling, the content was taken out and, thereafter, dehydrated and washed by means of a centrifuge. By removing moisture adhered to the surface by means of a flash dryer, there were obtained the composite resin beads.

Then, to an autoclave with an inner volume of 3 L equipped with a stirrer, 1000 g of deionized water, 5.0 g of tribasic calcium phosphate, 5 g of a 1% aqueous solution of sodium alkyl diphenyl ether disulfonate ("Pellex SSH" produced by Kao Corporation), and 500 g of the composite resin beads were charged and the mixture was stirred at 400 rpm.

After the air inside the autoclave was replaced with nitrogen, heating of the mixture was started and the temperature was raised to 70° C. over a period of 30 minutes. After maintaining at 70° C. for 4 hours, the mixture was cooled to 30° C. over a period of 6 hours. Meanwhile, when the temperature reached 70° C., 75 g of butane (a mixture of 20% by volume of n-butane and 80% by volume of isobutane) as a blowing agent was added into the autoclave over a period of 30 minutes.

After cooling, the content was taken out and magnesium pyrophosphate adhered on the surface of the resin beads was dissolved by addition of nitric acid. Thereafter, the content was dehydrated and washed by means of a centrifuge, followed by removal of moisture adhered to the surface by means of a flash dryer to obtain the expandable composite resin beads having an average particle diameter (d63) of 1.3 mm. Then, from the expandable composite resin beads obtained, the expanded composite resin beads and the molded article of expanded composite resin beads were obtained in the same manner as in Example 1. In Comparative Example 4 also, the same evaluation as in Example 1 was carried out and the results are shown in Table 3.

COMPARATIVE EXAMPLE 5

In the present example, first, the composite resin beads were obtained in the same manner as in Comparative Example 4. Subsequently, from the composite resin beads obtained, the expandable composite resin beads, the expanded composite resin beads, and the molded article of expanded composite resin beads were obtained in the same manner as in Example 1. In Comparative Example 5 also, the same evaluation as in Example 1 was carried out and the results are shown in Table 3.

COMPARATIVE EXAMPLE 6

In the present example, the composite resin beads were obtained in the same manner as in Example 1 except that, in the modification process to obtain the composite resin beads, 600 g of the polypropylene resin nuclear beads were added and the amounts of styrene monomers added at 60° C. and at 120° C. were changed to each 200 g. Subsequently, from the composite resin beads obtained, the expandable composite resin beads, the expanded composite resin beads, and the molded article of expanded composite resin beads were obtained in the same manner as in Example 1. In Comparative Example 6 also, the same evaluation as in Example 1 was carried out and the results are shown in Table 4.

COMPARATIVE EXAMPLE 7

In the present example, the composite resin beads were obtained in the same manner as in Example 1 except that, in the modification process to obtain the composite resin beads, 100 g of the polypropylene resin nuclear beads were added and the amounts of styrene monomers added at 60° C. and at 120° C. were changed to each 450 g. Subsequently, from the composite resin beads obtained, the expandable composite resin beads, the expanded composite resin beads, and the molded article of expanded composite resin beads were obtained in the same manner as in Example 1. In Comparative Example 7 also, the same evaluation as in Example 1 was carried out and the results are shown in Table 4.

COMPARATIVE EXAMPLE 8

The composite resin beads were obtained in the same manner as in Example 1 except that, in the modification process to obtain the composite resin beads, 250 g of the polypropylene resin nuclear beads were added and the amounts of styrene monomers added at 60° C. and at 120° C. were changed to 50 g and 700 g, respectively. Subsequently, from the composite resin beads obtained, the expandable composite resin beads, the expanded composite resin beads, and the molded article of expanded composite resin beads were obtained in the same manner as in Example 1. In Comparative Example 8 also, the same evaluation as in Example 1 was carried out and the results are shown in Table 4.

COMPARATIVE EXAMPLE 9

The composite resin beads were obtained in the same manner as in Example 1 except that, in the modification process to obtain the composite resin beads, 250 g of the polypropylene resin nuclear beads were added and the amounts of styrene monomers added at 60° C. and at 120° C. were changed to 100 g and 650 g, respectively. Subsequently, the expandable composite resin beads were obtained in the same manner as in Example 1 except that the amount of butane to be impregnated was changed to 100 g. Then, the molded article of expanded composite resin beads were obtained in the same manner as in Example 1 except that the expandable composite resin beads obtained were expanded to an apparent density of 20.0 kg/m$^3$ to obtain the expanded composite resin beads having an apparent expansion ratio of 50. In Comparative Example 9 also, the same evaluation as in Example 1 was carried out and the results are shown in Table 4.

TABLE 1

| | Example No. | | 1 | 2 | 3 | 4 | 5 |
|---|---|---|---|---|---|---|---|
| PP | Grade | — | F-794NV | F-794NV | F-794NV | F-794NV | F-794NV |
| | Melting point | ° C. | 135 | 135 | 135 | 135 | 135 |
| | Glass transition temperature of styrene resin (Tg) | ° C. | 100 | 100 | 100 | 100 | 100 |
| | PP/PS | — | 40/60 | 40/60 | 30/70 | 30/70 | 25/75 |
| | Blending method | — | Polymerization | Polymerization | Polymerization | Polymerization | Polymerization |
| | SM1 (=C) | % by mass | 30 | 40 | 35 | 50 | 45 |
| | SM1/PP (=C/E) | — | 0.75 | 1 | 1.2 | 1.7 | 1.8 |
| | SM1/(SM1 + SM2 + PP) (=C/(C + D + E)) | — | 0.3 | 0.4 | 0.35 | 0.5 | 0.45 |
| | SM1/SM2 (=C/D) | — | 1 | 2 | 1 | 2.5 | 1.5 |
| | Blowing agent | — | Butane | Butane | Butane | Butane | Butane |
| | Temperature for blowing agent impregnation | ° C. | 105 | 105 | 105 | 105 | 105 |
| | Expanding method | — | Impregnating expansion | Impregnating expansion | Impregnating expansion | Impregnating expansion | Impregnating expansion |
| Expanded composite resin bead | Continuous phase | — | PP | PP | PP | PP | PP |
| | Disperse phase | — | PS | PS | PS | PS | PS |
| | DMAX$_{ave}$ of disperse phases | μm | 0.4 | 0.3 | 0.6 | 0.5 | 0.8 |
| | DMAX$_{ave}$/DMIN$_{ave}$ of disperse phases | — | 3.1 | 3 | 3.2 | 3.3 | 3 |
| | Mw of PS | — | 350,000 | 330,000 | 380,000 | 360,000 | 390,000 |
| | Content of blowing agent | % by mass | 1.3 | 1.2 | 1.6 | 1.4 | 1.7 |
| | Molding pressure (Gauge pressure) | MPa | 0.22 | 0.22 | 0.22 | 0.22 | 0.22 |
| | Molding cycle | sec. | 310 | 310 | 330 | 320 | 340 |
| Molded article of expanded composite resin beads | Density | kg/m$^3$ | 33 | 33 | 33 | 33 | 33 |
| | 10% Compressive stress | MPa | 0.19 | 0.19 | 0.21 | 0.21 | 0.23 |
| | 50% Compressive stress | MPa | 0.34 | 0.34 | 0.37 | 0.37 | 0.39 |
| | Heat resistance (80° C.) | % | 0.1 | 0.1 | 0.5 | 0.5 | 0.7 |
| | Compression set | % | 8 | 8 | 6 | 6 | 7 |
| | Closed cell ratio | % | 85 | 85 | 85 | 85 | 85 |
| | Internal fusion ratio | % | 90 | 90 | 90 | 90 | 90 |

TABLE 2

| | Example No. | | 6 | 7 | 8 | 9 |
|---|---|---|---|---|---|---|
| PP | Grade | — | WFX4T | WFX4T | F-794NV | F-794NV |
| | Melting point | °C. | 125 | 125 | 135 | 135 |
| | Glass transition temperature of styrene resin (Tg) | °C. | 100 | 100 | 100 | 100 |
| | PP/PS | — | 30/70 | 40/60 | 40/60 | 40/60 |
| | Blending method | — | Polymerization | Polymerization | Polymerization | Polymerization |
| | SM1 (=C) | % by mass | 35 | 30 | 30 | 30 |
| | SM1/PP (=C/E) | — | 1.2 | 0.75 | 0.75 | 0.75 |
| | SM1/(SM1 + SM2 + PP) (=C/(C + D + E)) | — | 0.35 | 0.3 | 0.3 | 0.3 |
| | SM1/SM2 (=C/D) | — | 1 | 1 | 1 | 1 |
| | Blowing agent | — | Butane | Butane | Butane | Butane |
| | Temperature for blowing agent impregnation | °C. | 105 | 105 | 105 | 105 |
| | Expanding method | — | Impregnating expansion | Impregnating expansion | Impregnating expansion | Impregnating expansion |
| Expanded composite resin bead | Continuous phase | — | PP | PP | PP | PP |
| | Disperse phase | — | PS | PS | PS | PS |
| | $DMAX_{ave}$ of disperse phases | μm | 0.5 | 0.4 | 0.4 | 0.4 |
| | $DMAX_{ave}/DMIN_{ave}$ of disperse phases | — | 3.4 | 3 | 5 | 2 |
| | Mw of PS | — | 320,000 | 510,000 | 350,000 | 350,000 |
| | Content of blowing agent | % by mass | 1.6 | 1.4 | 1.1 | 1.5 |
| | Molding pressure (Gauge pressure) | MPa | 0.16 | 0.17 | 0.22 | 0.22 |
| | Molding cycle | sec. | 220 | 230 | 230 | 250 |
| Molded article of expanded composite resin beads | Density | kg/m³ | 33 | 33 | 20 | 50 |
| | 10% Compressive stress | MPa | 0.2 | 0.19 | 0.1 | 0.31 |
| | 50% Compressive stress | MPa | 0.35 | 0.34 | 0.23 | 0.57 |
| | Heat resistance (80° C.) | % | 0.6 | 0.3 | 0.2 | 0.2 |
| | Compression set | % | 13 | 16 | 7 | 10 |
| | Closed cell ratio | % | 75 | 80 | 85 | 85 |
| | Internal fusion ratio | % | 90 | 80 | 90 | 90 |

TABLE 3

| | Comparative Example No. | | 1 | 2 | 3 | 4 | 5 |
|---|---|---|---|---|---|---|---|
| PP | Grade | — | | | F-794NV | | |
| | Melting point | °C. | | | 135 | | |
| | Glass transition temperature of styrene resin (Tg) | °C. | | | 100 | | |
| | PP/PS | — | 40/60 | 40/60 | 40/60 | 40/60 | 40/60 |
| | Blending method | — | Polymerization | Polymerization | Melt-kneading | Polymerization | Polymerization |
| | SM1 (=C) | % by mass | 30 | 30 | 0 | 20 | 20 |
| | SM1/PP (=C/E) | — | 0.75 | 0.75 | 0 | 0.5 | 0.5 |
| | SM1/(SM1 + SM2 + PP) (=C/(C + D + E)) | — | 0.3 | 0.3 | 0 | 0.2 | 0.2 |
| | SM1/SM2 (=C/D) | — | 1 | 1 | — | 0.5 | 0.5 |
| | Blowing agent | — | $CO_2$ | Butane | Butane | Butane | Butane |
| | Temperature for blowing agent impregnation | °C. | 165 | 165 | 105 | 70 | 105 |
| | Expanding method | — | Direct expansion | Direct expansion | Impregnating expansion | Impregnating expansion | Impregnating expansion |
| Expanded composite resin bead | Continuous phase | — | Co-continuous phase | Co-continuous phase | PS | PS | PS |
| | Disperse phase | — | — | — | PP | PP | PP |
| | $DMAX_{ave}$ of disperse phases | μm | — | — | — | — | — |
| | $DMAX_{ave}/DMIN_{ave}$ of disperse phases | — | — | — | — | — | — |
| | Mw of PS | — | 350,000 | 350,000 | 200,000 | 280,000 | 280,000 |
| | Content of blowing agent | % by mass | 0 | 0.4 | 1.2 | 0.2 | 1.5 |

TABLE 3-continued

| Comparative Example No. | | | 1 | 2 | 3 | 4 | 5 |
|---|---|---|---|---|---|---|---|
| | Molding pressure (Gauge pressure) | MPa | 0.22 | 0.22 | 0.22 | 0.22 | 0.22 |
| | Molding cycle | sec. | 310 | 310 | 310 | 310 | 330 |
| Molded article of expanded composite resin beads | Density | kg/m$^3$ | 33 | 33 | 33 | 33 | 33 |
| | 10% Compressive stress | MPa | 0.14 | 0.14 | 0.14 | 0.17 | 0.17 |
| | 50% Compressive stress | MPa | 0.25 | 0.25 | 0.25 | 0.3 | 0.3 |
| | Heat resistance (80° C.) | % | 0.4 | 0.5 | 0.2 | 0.1 | 0.1 |
| | Compression set | % | 17 | 17 | 20 | 19 | 18 |
| | Closed cell ratio | % | 75 | 80 | 80 | 80 | 85 |
| | Internal fusion ratio | % | 50 | 70 | 80 | 60 | 70 |

TABLE 4

| Example No. | | | 6 | 7 | 8 | 9 |
|---|---|---|---|---|---|---|
| PP | Grade | — | | F-794NV | | |
| | Melting point | ° C. | | 135 | | |
| | Glass transition temperature of styrene resin (Tg) | ° C. | | 100 | | |
| | PP/PS | — | 60/40 | 10/90 | 25/75 | 25/75 |
| | Blending method | — | Polymerization | Polymerization | Polymerization | Polymerization |
| | SM1 (=C) | % by mass | 20 | 45 | 5 | 10 |
| | SM1/PP (=C/E) | — | 0.3 | 4.5 | 0.2 | 0.4 |
| | SM1/(SM1 + SM2 + PP) (=C/(C + D + E)) | — | 0.2 | 0.45 | 0.05 | 0.1 |
| | SM1/SM2 (=C/D) | — | 1 | 1 | 0.07 | 0.15 |
| | Blowing agent | — | Butane | Butane | Butane | Butane |
| | Temperature for blowing agent impregnation | ° C. | 105 | 105 | 105 | 105 |
| | Expanding method | — | Impregnating expansion | Impregnating expansion | Impregnating expansion | Impregnating expansion |
| Expanded composite resin bead | Continuous phase | — | Not Expanded | PS | PP | PP |
| | Disperse phase | — | | PP | PS | PS |
| | DMAX$_{ave}$ of disperse phases | μm | | — | 1.5 | 0.9 |
| | DMAX$_{ave}$/DMIN$_{ave}$ of disperse phases | — | | — | 3 | 12 |
| | Mw of PS | — | 400,000 | 400,000 | 400,000 | |
| | Content of blowing agent | % by mass | 2.2 | 1.9 | 1.3 | |
| | Molding pressure (Gauge pressure) | MPa | | 0.22 | 0.22 | 0.22 |
| | Molding cycle | sec. | | 350 | 340 | 320 |
| Molded article of expanded composite resin beads | Density | kg/m$^3$ | | 33 | 33 | 20 |
| | 10% Compressive stress | MPa | | 0.23 | 0.23 | 0.12 |
| | 50% Compressive stress | MPa | | 0.33 | 0.39 | 0.25 |
| | Heat resistance (80° C.) | % | | 1.3 | 0.7 | 0.7 |
| | Compression set | % | | 22 | 18 | 18 |
| | Closed cell ratio | % | | 80 | 85 | 85 |
| | Internal fusion ratio | % | | 80 | 90 | 90 |

[Results of Examples and Comparative Examples]

As known from Tables 1 and 2, the molded articles of the expanded composite resin beads obtained by in-mold molding of the expanded composite resin beads of Examples 1 to 9, which satisfied specific morphology, showed excellent performance in stiffness, heat resistance, and restoring properties.

Furthermore, by using low-melting point polypropylene resins as in Examples 6 and 7, it became possible to lower the molding heating temperature.

On the other hand, the molded article obtained by in-mold molding of the expanded composite resin beads as obtained in Comparative Examples 1 and 2 in which the polystyrene resin and the polypropylene resin formed a co-continuous phase, the expanded composite resin beads as obtained in Comparative Examples 3 to 5 and 7 which show a morphology where disperse phases made of a polypropylene resin were dispersed in a continuous phase made of a polystyrene resin, or the expanded composite resin beads as obtained in Comparative Examples 8 and 9 which show a morphology where disperse phases made of the polystyrene resin were dispersed in a continuous phase made of the polypropylene resin but DMAX$_{ave}$ of the disperse phases was outside the range of from 0.01 to 1 μm or the value of ratio of DMAX$_{ave}$ to DMIN$_{ave}$ (DMAX$_{ave}$/DMIN$_{ave}$) was outside the range of from 1 to 10, showed inferior stiffness and restoring properties. In addition, in Comparative Example 6, expanding was not possible.

The invention claimed is:

1. An expanded composite resin bead, comprising a styrene resin and a propylene resin,
wherein:
- a content of the propylene resin in the expanded composite resin bead is from 20 to 40% by mass with respect to a total of 100% by mass of the styrene resin and the propylene resin;
- a weight average molecular weight of the styrene resin is from 300,000 to 500,000;
- a plurality of disperse phases comprising the styrene resin are dispersed in a continuous phase comprising the propylene resin in a cross-section of a cell wall forming the expanded composite resin bead in a transmission electron micrograph; and
- an average value of maximum diameters of the disperse phases is from 0.01 to 1 μm and a value of a ratio of the average value of the maximum diameters to an average value of minimum diameters of the disperse phases is from 1 to 10.

2. The expanded composite resin bead according to claim 1, wherein a melting point of the propylene resin is from 115 to 140° C.

3. A molded article obtained by in-mold molding of the expanded composite resin beads according to claim 1, wherein the molded article has a density of from 10 to 200 kg/m$^3$, a closed cell ratio of 70% or more, and a fusion ratio of 60% or more.

4. The expanded composite resin bead according to claim 1, wherein the average value of the maximum diameters of the disperse phases is from 0.03 to 1 μm.

5. The expanded composite resin bead according to claim 1, wherein the average value of the maximum diameters of the disperse phases is from 0.05 to 1 μm.

6. The expanded composite resin bead according to claim 1, wherein the ratio of the average value of the maximum diameters to an average value of the minimum diameters of the disperse phases is from 1 to 7.

7. The expanded composite resin bead according to claim 1, wherein the ratio of the average value of the maximum diameters to an average value of the minimum diameters of the disperse phases is from 1 to 5.

8. The expanded composite resin bead according to claim 1, wherein the ratio of the average value of the maximum diameters to an average value of the minimum diameters of the disperse phases is from 2 to 5.

9. The expanded composite resin bead according to claim 1, wherein a melting point of the propylene resin is from 115 to 130° C.

10. The expanded composite resin bead according to claim 1, wherein the weight average molecular weight of the styrene resin is from 300,000 to 450,000.

11. The expanded composite resin bead according to claim 1, further comprising a physical blowing agent.

12. The expanded composite resin bead according to claim 11, comprising the physical blowing agent in an amount of 0.5 to 5 parts by mass with respect to 100 parts by mass of the expanded composite resin bead.

13. The expanded composite resin bead according to claim 1, which is prepared by employing a multi-step polymerization process satisfying the following equations (1)-(3):

$$0.50 < C/E \leq 4 \quad \text{Equation (1)},$$

$$C/(C+D+E) \geq 0.2 \times C/D \quad \text{Equation (2)},$$

$$C/(C+D+E) < 0.1 \times C/D + 0.4 \quad \text{Equation (3)},$$

wherein:
the multi-step polymerization process comprises adding styrene monomers to a suspension of propylene resin beads suspended in an aqueous medium; and
C represents a percent by mass of styrene monomers added to the suspension of the propylene resin beads at a temperature of below 80° C.,
D represents a percent by mass of styrene monomers added to the suspension of the propylene resin beads at a temperature of 80° C. or higher,
E represents a percent by mass of the propylene resin beads in the suspension of the propylene resin beads,
said percent by masses being relative to a total mass of the styrene monomers and the propylene resin beads.

* * * * *